United States Patent
Ma et al.

(10) Patent No.: US 10,764,408 B2
(45) Date of Patent: Sep. 1, 2020

(54) METHOD FOR ESTABLISHING WIRELESS CONNECTION AND DEVICE

(71) Applicant: Huawei Technologies Co., Ltd., Shenzhen, Guangdong (CN)

(72) Inventors: Jie Ma, Shenzhen (CN); Bo Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 13 days.

(21) Appl. No.: 16/188,908

(22) Filed: Nov. 13, 2018

(65) Prior Publication Data
US 2019/0082038 A1    Mar. 14, 2019

Related U.S. Application Data

(63) Continuation of application No. PCT/CN2016/082083, filed on May 13, 2016.

(51) Int. Cl.
*H04L 29/06* (2006.01)
*H04W 76/10* (2018.01)
(Continued)

(52) U.S. Cl.
CPC .............. *H04L 69/18* (2013.01); *H04L 41/12* (2013.01); *H04L 69/08* (2013.01); *H04W 48/08* (2013.01); *H04W 76/10* (2018.02); *H04W 76/11* (2018.02); *H04W 76/14* (2018.02); *H04W 76/27* (2018.02); *H04W 84/18* (2013.01); *H04W 88/04* (2013.01);
(Continued)

(58) Field of Classification Search
None
See application file for complete search history.

(56) References Cited

U.S. PATENT DOCUMENTS

| | | | | |
|---|---|---|---|---|
| 6,842,460 | B1 * | 1/2005 | Olkkonen | H04W 48/16 370/328 |
| 2001/0006512 | A1 * | 7/2001 | Takabatake | H04L 29/06027 370/329 |

(Continued)

FOREIGN PATENT DOCUMENTS

| | | |
|---|---|---|
| CN | 102172093 A | 8/2011 |
| CN | 103580791 A | 2/2014 |

(Continued)

*Primary Examiner* — Anh Vu H Ly
(74) *Attorney, Agent, or Firm* — Kilpatrick Townsend & Stockton LLP

(57) ABSTRACT

Embodiments of the present disclosure provide a method for establishing a wireless connection and a device. A first terminal establishes a wireless connection to a second terminal, and a non-cellular network protocol transmission technology is used for the wireless connection, so that the first terminal transmits, through the wireless connection to the second terminal, a data packet of a protocol type or a service attribute that can be recognized by a network device to the network device, to enable receiving and transmitting parties, namely, the first terminal and the second terminal, to have consistent knowledge on a protocol type or a service attribute (for example, a PSM) of a data packet of an upper layer of a logical link control protocol layer or a Media Access Control layer in respective non-cellular network protocols without making a standardized change to the non-cellular network protocols.

18 Claims, 8 Drawing Sheets

(51) Int. Cl.
   *H04W 76/14* (2018.01)
   *H04W 76/11* (2018.01)
   *H04W 76/27* (2018.01)
   *H04L 12/24* (2006.01)
   *H04W 48/08* (2009.01)
   *H04W 88/04* (2009.01)
   *H04W 84/18* (2009.01)

(52) U.S. Cl.
   CPC .............. *Y02D 70/00* (2018.01); *Y02D 70/10* (2018.01); *Y02D 70/14* (2018.01)

(56) References Cited

U.S. PATENT DOCUMENTS

| | | | |
|---|---|---|---|
| 2005/0261007 A1* | 11/2005 | Van Valkenburg ... | H04W 76/10 455/466 |
| 2010/0040029 A1 | 2/2010 | Doppler et al. | |
| 2010/0274874 A1* | 10/2010 | Reunamaki ............ | H04L 67/16 709/218 |
| 2012/0052802 A1* | 3/2012 | Kasslin ................ | H04W 48/12 455/41.2 |
| 2013/0157568 A1 | 6/2013 | Jain et al. | |
| 2013/0262184 A1* | 10/2013 | Jain .................... | G06Q 30/0205 705/7.34 |
| 2014/0092885 A1 | 4/2014 | Venkatachalam et al. | |
| 2014/0113557 A1* | 4/2014 | Jain ..................... | H04M 1/7253 455/41.2 |
| 2015/0043427 A1* | 2/2015 | K.M. .................... | H04W 8/005 370/328 |
| 2015/0133112 A1 | 5/2015 | Wang et al. | |
| 2015/0245191 A1 | 8/2015 | Xu | |
| 2016/0050551 A1* | 2/2016 | Qi ........................ | H04W 48/16 455/434 |
| 2016/0112939 A1* | 4/2016 | Senese .................... | H04B 7/26 370/329 |
| 2017/0086098 A1 | 3/2017 | Kwon et al. | |
| 2017/0195867 A1 | 7/2017 | Kim et al. | |
| 2017/0215113 A1 | 7/2017 | Lee et al. | |
| 2018/0343701 A1* | 11/2018 | Ma ........................ | H04W 88/06 370/328 |
| 2019/0190587 A1* | 6/2019 | Ma ........................ | H04W 76/10 370/328 |

FOREIGN PATENT DOCUMENTS

| | | |
|---|---|---|
| CN | 103634845 A | 3/2014 |
| CN | 204707282 U | 10/2015 |
| EP | 2792090 B1 | 10/2014 |
| EP | 3402307 A1 | 11/2018 |
| WO | 03098881 A1 | 11/2003 |
| WO | 2015120625 A1 | 8/2015 |
| WO | 2015/137601 A1 | 9/2015 |
| WO | 2016/17907 A1 | 2/2016 |

* cited by examiner

METHOD FOR ESTABLISHING WIRELESS CONNECTION AND DEVICE

CROSS-REFERENCE TO RELATED APPLICATIONS

This application is a continuation of International Application No. PCT/CN2016/082083, filed on May 13, 2016, the disclosure of which is hereby incorporated by reference in its entirety.

TECHNICAL FIELD

Embodiments of the present disclosure relate to communications technologies, and in particular, to a method for establishing a wireless connection and a device.

BACKGROUND

With vigorous development of wearable devices (Wearable equipment, WE), the wearable devices are widely applied to daily life of people. However, in consideration of features, such as a small volume, a small battery capacity, and low power consumption of the wearable device, the wearable device cannot directly communicate with a network device in a cellular network. The wearable device needs to communicate with the network device in the cellular network through a relay device, to enable the network device to provide a service for the wearable device. For example, data obtained by a wearable device includes physiological data of a wearer obtained by the wearable device, a relay device may be an intelligent mobile terminal of the wearer of the wearable device, and the wearable device may alternatively be used as a convenient portable communications tool, to provide services, such as short messaging service message receiving, time checking, and location positioning, for the wearer.

In a process in which a wearable device communicates with a network device in a cellular network through a relay device, a non-cellular network protocol transmission technology, for example, a Bluetooth technology, may be used as a communication manner between the wearable device and the relay device. In a Bluetooth technology-based protocol stack, there are various protocol layers, such as a protocol layer of a cellular network, above a Logical Link Control and Adaptation Protocol (L2CAP) layer. Therefore, the L2CAP layer needs to learn of and clarify a specific protocol stack entity to which sent or received data needs to be sent for processing. A protocol data unit (PDU) header of the L2CAP layer includes a protocol/service multiplexer (PSM) domain. A length of the PSM field is 16 bits, some values of the 16 bits have been defined in Bluetooth Special Interest Group (BT SIG), and some other values are dynamically allocated by using the service discovery protocol (SDP). A data packet can be correctly parsed only when both receiving and transmitting parties have consistent knowledge on the PSM field. Therefore, without making a standardized change to the non-cellular network protocol, how to enable receiving and transmitting parties to have consistent knowledge on the PSM field is a problem that urgently needs to be resolved currently.

SUMMARY

Embodiments of the present disclosure provide a method for establishing a wireless connection and a device, to enable receiving and transmitting parties to have consistent knowledge on a protocol type or a service attribute (for example, a PSM) of a data packet of respective upper layers without making a standardized change to a non-cellular network protocol.

According to a first aspect, an embodiment of the present disclosure provides a method for establishing a wireless connection. The method includes: obtaining, by a first terminal, parameter information, where the parameter information is used to indicate a protocol type or a service attribute of a data packet; and establishing, by the first terminal, a wireless connection to a second terminal based on the parameter information, where a non-cellular network protocol transmission technology is used for the wireless connection, and the first terminal transmits the data packet of the protocol type or the service attribute to a network device through the wireless connection to the second terminal.

In this embodiment of the present disclosure, the first terminal establishes the wireless connection to the second terminal, and the non-cellular network protocol transmission technology is used for the wireless connection, so that the first terminal transmits, through the wireless connection to the second terminal, the data packet of the protocol type or the service attribute that can be recognized by the network device to the network device, to enable receiving and transmitting parties, namely, the first terminal and the second terminal, to have consistent knowledge on a protocol type or a service attribute (for example, a PSM) of a data packet of a top layer of a logical link control protocol layer or a Media Access Control layer in respective non-cellular network protocols without making a standardized change to the non-cellular network protocols.

In a first possible implementation of the first aspect, the parameter information includes at least any one of PSM values corresponding to a cellular network protocol service identifier, a version number of a cellular network protocol, and a cellular network protocol type. The cellular network protocol service identifier, the version number of the cellular network protocol, or the cellular network protocol type corresponds to at least one PSM value.

In a second possible implementation of the first aspect, the obtaining, by a first terminal, parameter information may include: receiving, by the first terminal, a radio resource control (RRC) message sent by an access network device, where the RRC message carries the parameter information. The RRC message may include a system broadcast message, independent signaling for the first terminal, or the like. Alternatively, the obtaining, by a first terminal, parameter information may include: receiving, by a first device, a non-access stratum (NAS) message sent by a core network device, where the NAS message carries the parameter information.

In a third possible implementation of the first aspect, the non-cellular network protocol transmission technology may include any one of the following transmission technologies: a Wireless Fidelity (Wi-Fi) technology, a ZigBee (zigbee) technology, a Bluetooth (BT) technology, a Bluetooth low energy (BLE) technology, and a Wireless Fidelity Direct (Wi-Fi direct) technology, and the like.

In a fourth possible implementation of the first aspect, when the non-cellular network protocol transmission technology is a Bluetooth technology, the establishing, by the first terminal, a wireless connection to a second terminal based on the parameter information may include: sending, by the first terminal, a probe request message when the first terminal detects that a Bluetooth function of the first terminal is enabled, where the probe request message carries an identifier of the first terminal and the parameter information of the protocol or service attribute of the data packet of the first terminal; receiving, by the first terminal, a probe response message sent by the second terminal, where the probe response message is generated after the second terminal detects the probe request message, and the probe response message carries an identifier of the second terminal; sending, by the first terminal, a logical link request message to the second terminal, where the logical link request message carries a channel identifier of the first terminal and a PSM value of the first terminal; receiving, by the first terminal, a logical link response message sent by the second terminal, where the logical link response message carries a channel identifier of the second terminal and the channel identifier of the first terminal; and determining, by the first terminal, that data from the channel identifier of the second terminal is processed by a protocol stack entity corresponding to the PSM value of the first terminal.

In a fifth possible implementation of the first aspect, the parameter information may further include: a correspondence between a quality of service (QoS) parameter in the cellular network protocol and an L2CAP parameter in the Bluetooth technology.

In a sixth possible implementation of the first aspect, the obtaining, by a first terminal, parameter information may include: obtaining, by the first terminal, the parameter information configured in advance.

In a seventh possible implementation of the first aspect, the establishing, by the first terminal, a wireless connection to a second terminal based on the parameter information may include: sending, by the first terminal, a first message to the network device when the first terminal detects that a short-range wireless or low-power wireless function of the first terminal is enabled and detects the second terminal on a short-range wireless or low-power wireless channel, where the first message carries an identifier of the second terminal, and the first message is used to instruct the first terminal to find a Media Access Control layer of the second terminal for establishing the wireless connection, and a connection between the first terminal and the network device has been established; receiving, by the first terminal, a first short-range wireless or low-power wireless terminal pairing message sent by the network device, where the first short-range wireless or low-power wireless terminal pairing message carries at least a PSM value of the second terminal, and the PSM value of the second terminal is used to indicate that an upper-layer data protocol of a logical link control protocol layer of a short-range wireless or low-power wireless technology in the second terminal is a cellular network protocol or that the PSM value of the second terminal is in a one-to-one correspondence with a cellular radio bearer (RB); and configuring, by the first terminal, a logical link control protocol layer, an adaptation layer, or a Media Access Control layer of the first terminal based on the PSM value of the second terminal, to establish the wireless connection to the second terminal.

In an eighth possible implementation of the first aspect, the first message may further include a serving cell identifier of the second terminal.

In a ninth possible implementation of the first aspect, the first message may further include a PSM value of the first terminal, where the PSM value of the first terminal is used to indicate that an upper-layer data protocol of a logical link control protocol layer or a Media Access Control layer of a short-range wireless or low-power wireless technology in the first terminal is a cellular network protocol.

In a possible design, after the obtaining, by a first terminal, parameter information, the method may further include: storing, by the first terminal, the parameter information.

According to a second aspect, an embodiment of the present disclosure provides a method for establishing a wireless connection. The method includes: sending, by a network device, a second message to a first terminal, where the second message carries at least parameter information, the parameter information is used to indicate a protocol type or a service attribute of a data packet, and the second message is used to instruct the first terminal to establish a wireless connection to a second terminal based on the parameter information. A non-cellular protocol transmission technology is used for the wireless connection between the first terminal and the second terminal, and the first terminal transmits the data packet of the protocol type or the service attribute to the network device through the wireless connection to the second terminal.

In this embodiment of the present disclosure, the first terminal establishes the wireless connection to the second terminal, and the non-cellular network protocol transmission technology is used for the wireless connection, so that the first terminal transmits, through the wireless connection to the second terminal, the data packet of the protocol type or the service attribute that can be recognized by the network device to the network device, to enable receiving and transmitting parties, namely, the first terminal and the second terminal, to have consistent knowledge on a protocol type or a service attribute (for example, a PSM) of a data packet of a top layer of a logical link control protocol layer or a Media Access Control layer in respective non-cellular network protocols without making a standardized change to the non-cellular network protocols.

In a first possible implementation of the second aspect, the parameter information includes at least any one of PSM values corresponding to a cellular network protocol service identifier, a version number of a cellular network protocol, and a cellular network protocol type. The cellular network protocol service identifier, the version number of the cellular network protocol, or the cellular network protocol type corresponds to at least one PSM value.

In a second possible implementation of the second aspect, the sending, by a network device, a second message to a first terminal may include: sending, by an access network device, an RRC message to the first terminal, where the RRC message carries the parameter information, and the RRC message includes a system broadcast message, independent signaling for the first terminal, or the like; or sending, by a core network device, an NAS message to the first device, where the NAS message carries the parameter information.

In a third possible implementation of the second aspect, the non-cellular network protocol transmission technology may include any one of the following transmission technologies: a Wi-Fi technology, a ZigBee technology, a BT technology, a BLE technology, a Wireless Fidelity Direct technology, and the like.

In a fourth possible implementation of the second aspect, the parameter information may further include a correspondence between a QoS parameter in the cellular network protocol and an L2CAP parameter in the Bluetooth technology.

According to a third aspect, an embodiment of the present disclosure provides a method for establishing a wireless connection. The method includes: receiving, by a network device, a first message sent by a first terminal, where the first message carries an identifier of a second terminal, and the first message is used to instruct the first terminal to find a second terminal to which a wireless connection is established, and a connection between the first terminal and the network device has been established; and sending, by the network device, a first short-range wireless or low-power wireless terminal pairing message to the first terminal, where the first short-range wireless or low-power wireless terminal pairing message carries at least a PSM value of the second terminal, and the PSM value of the second terminal is used to indicate that an upper-layer data protocol of a logical link control protocol layer of a short-range wireless or low-power wireless technology in the second terminal is a cellular network protocol or that the PSM value of the second terminal is in a one-to-one correspondence with a cellular radio bearer RB; and the first short-range wireless or low-power wireless terminal pairing message is used to instruct the first terminal to configure a logical link control protocol layer, an adaptation layer, or a Media Access Control layer of the first terminal based on the PSM value of the second terminal, to establish the wireless connection to the second terminal.

In this embodiment of the present disclosure, the first terminal establishes the wireless connection to the second terminal, and the non-cellular network protocol transmission technology is used for the wireless connection, so that the first terminal transmits, through the wireless connection to the second terminal, the data packet of the protocol type or the service attribute that can be recognized by the network device to the network device, to enable receiving and transmitting parties, namely, the first terminal and the second terminal, to have consistent knowledge on a protocol type or a service attribute (for example, a PSM) of a data packet of a top layer of a logical link control protocol layer or a Media Access Control layer in respective non-cellular network protocols without making a standardized change to the non-cellular network protocols.

In a first possible implementation of the third aspect, the first message may further include a serving cell identifier of the second terminal.

In a second possible implementation of the third aspect, the first message may further include a PSM value of the first terminal, and the PSM value of the first terminal is used to indicate that an upper-layer data protocol of a logical link control protocol layer of a short-range wireless or low-power wireless technology in the first terminal is a cellular network protocol.

In a third possible implementation of the third aspect, after the receiving, by a network device, a first message sent by a first terminal, the method may further include: sending, by the network device, a second short-range wireless or low-power wireless terminal pairing message to the second terminal, where the second short-range wireless or low-power wireless terminal pairing message carries at least the PSM value of the first terminal, and the PSM value of the first terminal is used to indicate that an upper-layer data protocol of a logical link control protocol layer of a short-range wireless or low-power wireless technology in the first terminal is a cellular network protocol or that the PSM value of the first terminal is in a one-to-one correspondence with the cellular RB; and the second short-range wireless or low-power wireless terminal pairing message is used to instruct the second terminal to configure a logical link control protocol layer, an adaptation layer, or a Media Access Control layer of the second terminal based on the PSM value of the first terminal, to establish the wireless connection to the first terminal.

According to a fourth aspect, an embodiment of the present disclosure provides a method for establishing a wireless connection. The method includes: establishing, by a second terminal, a wireless connection to a first terminal, where a non-cellular network protocol transmission technology is used for the wireless connection, and the first terminal transmits a data packet of a protocol type or a service attribute indicated by parameter information to a network device through the wireless connection to the second terminal.

In this embodiment of the present disclosure, the first terminal establishes the wireless connection to the second terminal, and the non-cellular network protocol transmission technology is used for the wireless connection, so that the first terminal transmits, through the wireless connection to the second terminal, the data packet of the protocol type or the service attribute that can be recognized by the network device to the network device, to enable receiving and transmitting parties, namely, the first terminal and the second terminal, to have consistent knowledge on a protocol type or a service attribute (for example, a PSM) of a data packet of a top layer of a logical link control protocol layer or a Media Access Control layer in respective non-cellular network protocols without making a standardized change to the non-cellular network protocols.

In a first possible implementation of the fourth aspect, the parameter information may include at least any one of PSM values corresponding to a cellular network protocol service identifier, a version number of a cellular network protocol, and a cellular network protocol type, and the cellular network protocol service identifier, the version number of the cellular network protocol, or the cellular network protocol type corresponds to at least one PSM value.

In a second possible implementation of the fourth aspect, the non-cellular network protocol transmission technology may include any one of the following transmission technologies: a Wi-Fi technology, a ZigBee technology, a BT technology, a BLE technology, and a Wireless Fidelity Direct technology.

In a third possible implementation of the fourth aspect, when the non-cellular network protocol transmission technology is a Bluetooth technology, the establishing, by a second terminal, a wireless connection to a first terminal may include: receiving, by the second terminal, a probe request message sent by the first terminal, where the probe request message carries an identifier of the first terminal and the parameter information of the protocol or service attribute of the data packet of the first terminal; generating, by the second terminal, a probe response message based on the probe request message, where the probe response message carries an identifier of the second terminal; sending, by the second terminal, the probe response message to the first terminal; receiving, by the second terminal, a logical link request message sent by the first terminal, where the logical link request message carries a channel identifier of the first terminal and a PSM value of the first terminal; determining, by the second terminal, that data from the channel identifier of the first terminal is processed by a protocol stack entity corresponding to a PSM value of the second terminal; and sending, by the second terminal, a logical link response message to the first terminal, where the logical link response message carries a channel identifier of the second terminal and the channel identifier of the first terminal, and the channel identifier of the second terminal is used to instruct the first terminal to summit data from the channel identifier of the second terminal to a protocol stack entity corresponding to the PSM value of the first terminal for processing.

In a fourth possible implementation of the fourth aspect, the parameter information may further include a correspondence between a QoS parameter in the cellular network protocol and an L2CAP parameter in the Bluetooth technology.

In a fifth possible implementation of the fourth aspect, the establishing, by a second terminal, a wireless connection to a first terminal may include: receiving, by the second terminal, a second short-range wireless or low-power wireless terminal pairing message sent by the network device, where the second short-range wireless or low-power wireless terminal pairing message carries at least a PSM value of the first terminal, and the PSM value of the first terminal is used to indicate that an upper-layer data protocol of a logical link control protocol layer of a short-range wireless or low-power wireless technology in the first terminal is a cellular network protocol or that the PSM value of the first terminal is in a one-to-one correspondence with a cellular RB; and configuring, by the second terminal, a logical link control protocol layer, an adaptation layer, or a Media Access Control layer of the second terminal based on the PSM value of the first terminal, to establish the wireless connection to the first terminal.

According to a fifth aspect, an embodiment of the present disclosure provides a terminal. The terminal serves as a first terminal and includes: an obtaining module, configured to obtain parameter information, where the parameter information is used to indicate a protocol type or a service attribute of a data packet; and a processing module, configured to establish a wireless connection to a second terminal based on the parameter information, where a non-cellular network protocol transmission technology is used for the wireless connection, and the first terminal transmits the data packet of the protocol type or the service attribute to a network device through the wireless connection to the second terminal.

Based on a same inventive concept, because a principle in which the apparatus resolves a problem corresponds to that of a solution in the design of the method according to the first aspect, for implementation of the apparatus, refer to implementation of the method. Details of repeated parts are not described herein again.

According to a sixth aspect, an embodiment of the present disclosure provides a network device, including: a sending module, configured to send a second message to a first terminal, where the second message carries at least parameter information, the parameter information is used to indicate a protocol type or a service attribute of a data packet, the second message is used to instruct the first terminal to establish a wireless connection to a second terminal based on the parameter information, a non-cellular protocol transmission technology is used for the wireless connection between the first terminal and the second terminal, and the first terminal transmits the data packet of the protocol type or the service attribute to the network device through the wireless connection to the second terminal.

Based on a same inventive concept, because a principle in which the apparatus resolves a problem corresponds to that of a solution in the design of the method according to the second aspect, for implementation of the apparatus, refer to implementation of the method. Details of repeated parts are not described herein again.

According to a seventh aspect, an embodiment of the present disclosure provides a network device, including: a receiving module, configured to receive a first message sent by a first terminal, where the first message carries an identifier of a second terminal, and the first message is used to instruct the first terminal to find the second terminal to which a wireless connection is established, and a connection between the first terminal and the network device has been established; and a sending module, configured to send a first short-range wireless or low-power wireless terminal pairing message to the first terminal, where the first short-range wireless or low-power wireless terminal pairing message carries at least a PSM value of the second terminal, and the PSM value of the second terminal is used to indicate that an upper-layer data protocol of a logical link control protocol layer of a short-range wireless or low-power wireless technology in the second terminal is a cellular network protocol or that the PSM value of the second terminal is in a one-to-one correspondence with a cellular RB; and the first short-range wireless or low-power wireless terminal pairing message is used to instruct the first terminal to configure a logical link control protocol layer, an adaptation layer, or a Media Access Control layer of the first terminal based on the PSM value of the second terminal, to establish the wireless connection to the second terminal.

Based on a same inventive concept, because a principle in which the apparatus resolves a problem corresponds to that of a solution in the design of the method according to the third aspect, for implementation of the apparatus, refer to implementation of the method. Details of repeated parts are not described herein again.

According to an eighth aspect, an embodiment of the present disclosure provides a terminal. The terminal serves as a second terminal and includes: a processing module, configured to establish a wireless connection to a first terminal, where a non-cellular network protocol transmission technology is used for the wireless connection, and the first terminal transmits a data packet of a protocol type or a service attribute indicated by parameter information to a network device through the wireless connection to the second terminal.

Based on a same inventive concept, because a principle in which the apparatus resolves a problem corresponds to that of a solution in the design of the method according to the fourth aspect, for implementation of the apparatus, refer to implementation of the method. Details of repeated parts are not described herein again.

According to a ninth aspect, an embodiment of the present disclosure provides a terminal. The terminal serves as a first terminal and includes a processor and a memory that is configured to store an executable instruction. The processor is configured to execute the executable instruction, to perform the method according to any one of the implementations of the first aspect.

According to a tenth aspect, an embodiment of the present disclosure provides a network device, including: a processor and a memory that is configured to store an executable instruction. The processor is configured to execute the executable instruction, to perform the method according to any one of the implementations of the second aspect and the third aspect.

According to an eleventh aspect, an embodiment of the present disclosure provides a terminal. The terminal serves as a second terminal and includes a processor and a memory that is configured to store an executable instruction. The processor is configured to execute the executable instruction, to perform the method according to any one of the implementations of the fourth aspect.

According to a twelfth aspect, an embodiment of the present disclosure provides a non-transitory computer-readable storage medium storing one or more programs. The one or more programs include an instruction, when being executed by a terminal or a network device, the instruction enables the terminal or the network device to execute a solution the foregoing corresponding method design. Details of repeated parts are not described herein again.

In a possible design, in any one of the foregoing technical solutions, a type of a data packet transmitted by a first terminal through a wireless connection to a second terminal includes any one or a combination of the following types: a protocol type, a data flow type, a service type, and the like.

In a possible design, functions of an obtaining module and a processing module in the embodiments of the present disclosure may be specifically implemented by a processor in a corresponding terminal or network device. A function of a sending module may be specifically implemented by a transmitter in a corresponding terminal or network device, and a function of a receiving module may be specifically implemented by a receiver in a corresponding terminal or network device. The transmitter and the receiver may be set independently, or may be integrated into a transceiver.

It is clearer and easier to understand the foregoing and other aspects of the present disclosure in descriptions of the following (plurality of) embodiments.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification and claims of the embodiments of the present disclosure, the terms "first", "second", and so on are intended to distinguish between similar objects but do not indicate a particular order or sequence. It should be understood that the data termed in such a way are interchangeable in proper circumstances so that the embodiments of the present disclosure described herein can be, for example, implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The technical solutions in the present disclosure may be applied to various wireless cellular network communications systems, for example, a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, and a Universal Mobile Telecommunications System (UMTS). This is not limited in the present disclosure.

Figure 1:
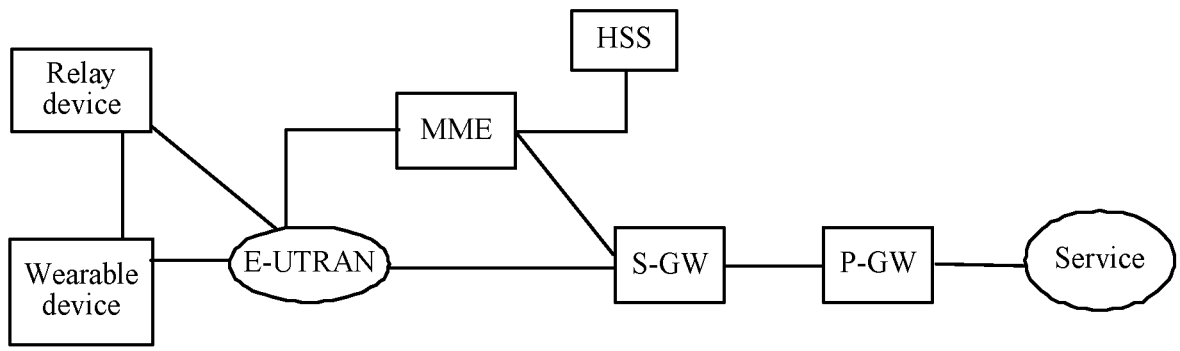
FIG. 1 is a schematic diagram of a network architecture of an LTE system according to the present disclosure.

The embodiments of the present disclosure can be applied to the following scenario: a wearable device performs uplink and downlink data transmission to a network device in a cellular network through a relay device. FIG. 1 is a schematic diagram of a network architecture of an LTE system according to the present disclosure. As shown in FIG. 1, a main network entity of the LTE system has the following functions:

An evolved universal terrestrial radio access network (E-UTRAN) is a network including a plurality of evolved NodeBs (evolved Node Base, eNB) and implements a wireless physical layer function, resource scheduling, radio resource management, radio access control, and a mobility management function. An eNB is connected to a serving gateway (S-GW) through a user-plane interface S1-U to transfer user data, is connected to a mobility management entity (MME) through a control-plane interface S1-MME, and implements a function, such as radio access bearer control, by using an S1-AP protocol.

The MME is mainly responsible for all control-plane functions of session management of a user, including non-access stratum (NAS) signaling and security, management on a tracking area, and selection of a core network element such as a packet data network gateway (P-GW) or an S-GW, and corresponds a control plane portion of a Serving GPRS Support Node (SGSN) inside a present UMTS system.

The S-GW is mainly responsible for data transmission, forwarding, router switching, and the like of user equipment (UE), and is used as a local mobility anchor when the UE is handed over between eNBs. Each user equipment is served by only one S-GW at each moment.

The P-GW serves as an anchor connected to a public data network (PDN), and is responsible for allocating an Internet protocol (IP) address to the UE, filtering a data message of the UE, controlling a rate, and generating charging information, and the like.

A home subscriber server (HSS) is configured to store subscription information of a user.

The embodiments of the present disclosure provide a method for establishing a wireless connection and a device, to enable receiving and transmitting parties to have consistent knowledge on a protocol type or a service attribute (for example, a PSM) of a data packet of an upper layer of a logical link control protocol layer or a Media Access Control layer in respective non-cellular network protocols. The method and the apparatus are conceived based on a same disclosure. The method and the apparatus have similar principles for resolving the problems. Therefore, for implementation of the apparatus and the method, reference may be made to each other, and details of repeated parts are not described.

A first terminal includes a wearable device, which may alternatively be referred to as a remote device. The wearable device includes smart glasses, a smart band, a smartwatch, smart shoes, and the like. A second terminal includes a relay device, for example, an intelligent mobile terminal such as a mobile phone. A network device includes a device in a cellular network to which the second terminal is connected. Specifically, the network device may be a base station. The first terminal communicates with the network device through a wireless connection to the second terminal. A non-cellular network protocol transmission technology is used for the wireless connection. The non-cellular network protocol transmission technology may be any one of the following transmission technologies: a Wi-Fi technology, a ZigBee technology, a BT technology, a BLE technology, a Wireless Fidelity Direct technology, and the like. In the embodiments of the present disclosure, the non-cellular network protocol is described by using a Bluetooth protocol and a Wi-Fi protocol as examples, but the embodiments of the present disclosure are not limited thereto.

Figure 2A:
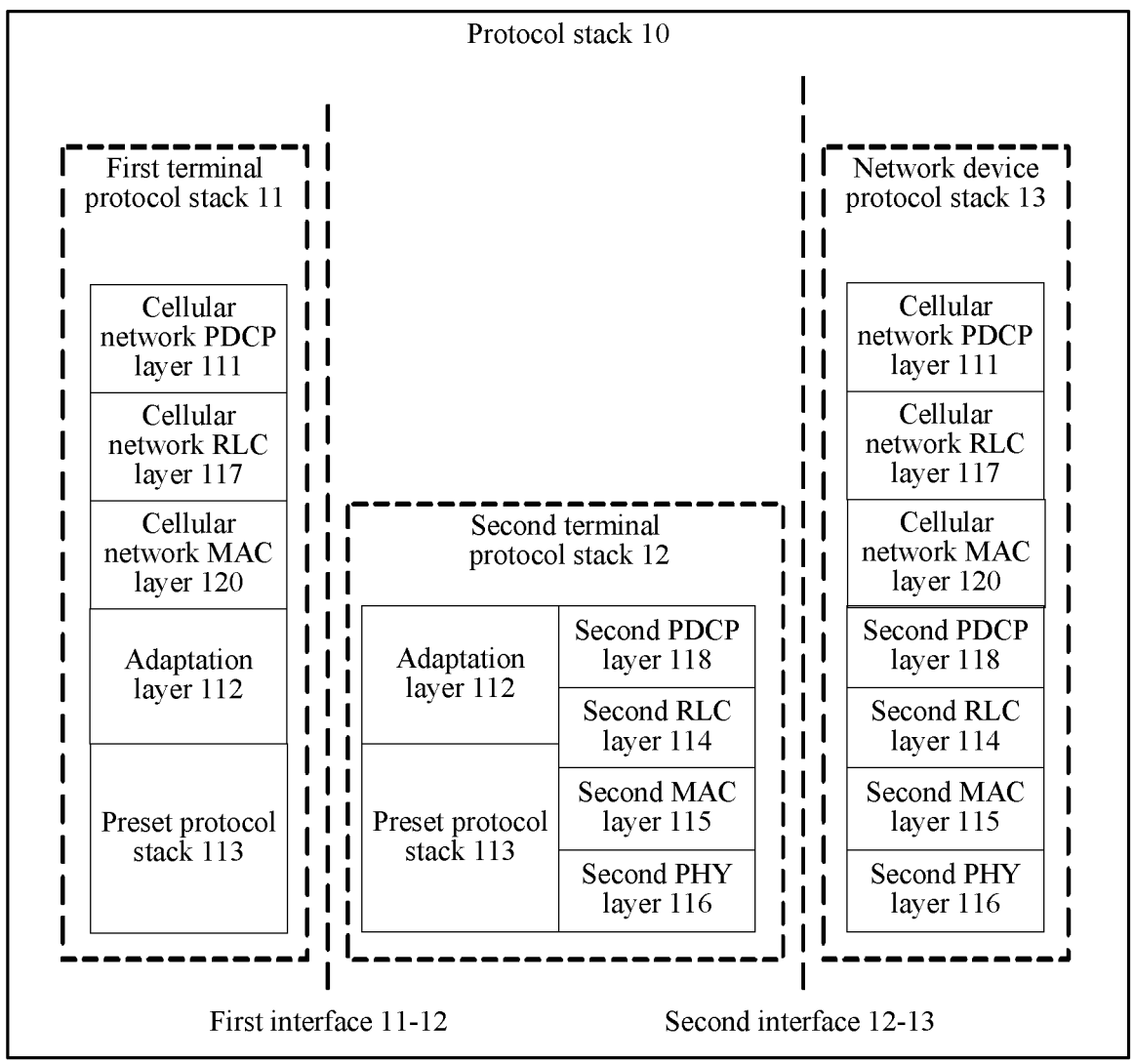
FIG. 2a is a schematic structural diagram of a user-plane protocol stack.
Figure 2B:
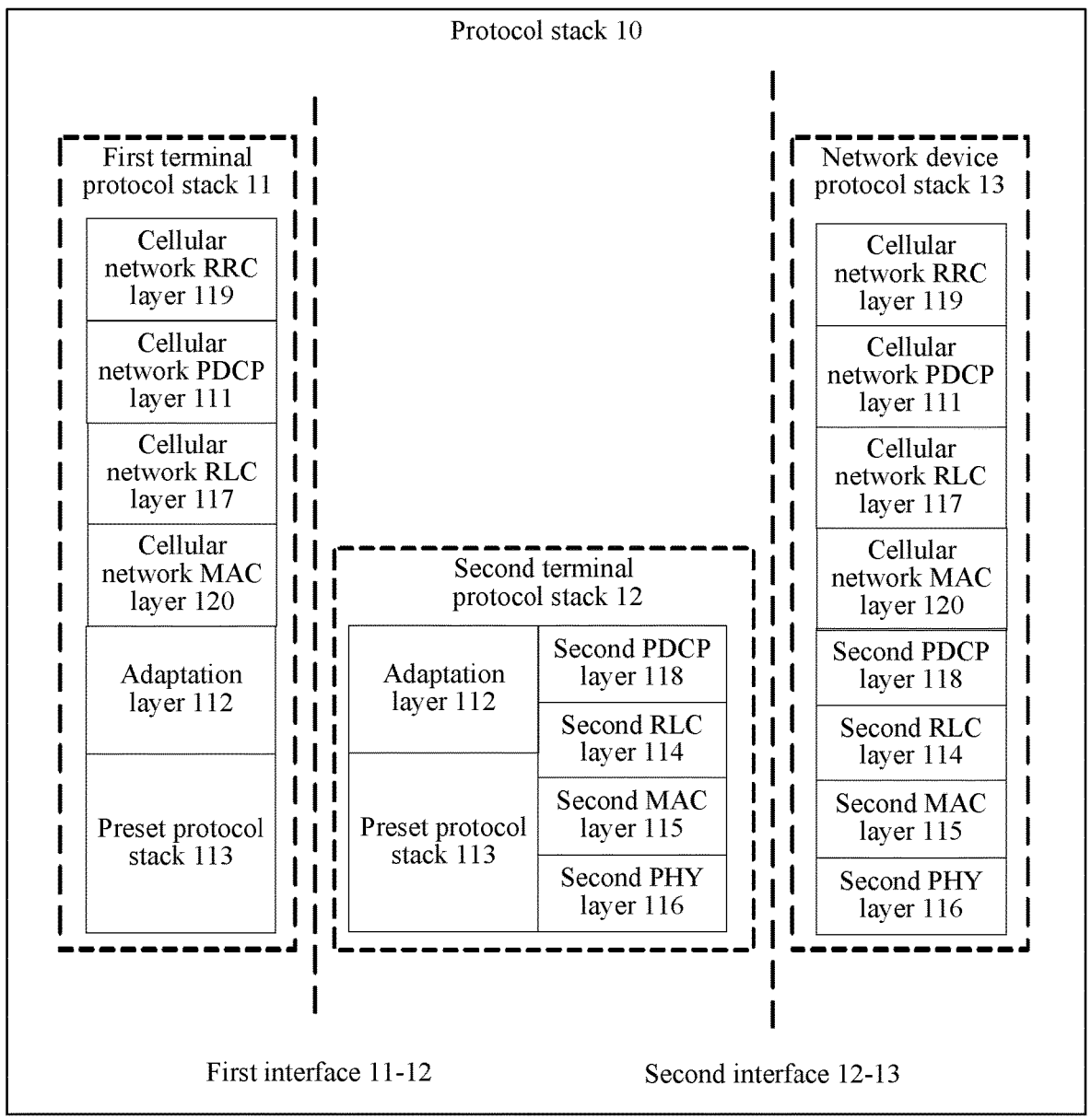
FIG. 2b is a schematic structural diagram of a control-plane protocol stack.

Technical solutions provided in the embodiments of the present disclosure are based on protocol stacks shown in FIG. 2a and FIG. 2b. FIG. 2a shows a user-plane protocol stack, and FIG. 2b shows a control-plane protocol stack. A protocol stack 10 shown in FIG. 2a and FIG. 2b is applied to a system in which a first terminal is connected to a network device through a second terminal.

The user-plane protocol stack 10 in FIG. 2a includes: a first terminal protocol stack 11, a second terminal protocol stack 12, and a network device protocol stack 13.

The first terminal protocol stack 11 includes: a Packet Data Convergence Protocol (PDCP) layer 111, an adaptation layer 112, and a preset protocol stack 113 that are sequentially disposed from a top layer to a bottom layer. The preset protocol stack 113 is based on the Bluetooth protocol or the Wi-Fi protocol. The adaptation layer 112 is configured to: implement a function of converting a data packet between a preset-protocol-based data packet and a cellular network data packet, and implement a function of configuring parameter information of the preset protocol stack 113.

If a data packet is transmitted between the first terminal and the second terminal through a Bluetooth protocol-based communications link, the preset protocol stack 113 is based on the Bluetooth protocol. The preset protocol stack 113 includes an L2CAP layer and a first physical (Physical, PHY) layer that are sequentially disposed from a top layer to a bottom layer.

If a data packet is transmitted between the first terminal and the second terminal through a Wi-Fi protocol-based communications link, the preset protocol stack 113 is based on the Wi-Fi protocol. The preset protocol stack 113 includes a first Media Access Control (MAC) layer and a first PHY layer that are sequentially disposed from a top layer to a bottom layer.

The second terminal protocol stack 12 includes: a protocol stack on a side of a first interface 11-12 between the second terminal and the first terminal and a protocol stack on a side of a second interface 12-13 between the second terminal and the network device. The first interface 11-12 is an E-PC5-Bluetooth interface or an E-PC5-Wi-Fi interface, and the second interface 12-13 is a UU interface.

The protocol stack on the side of the first interface 11-12 includes an adaptation layer 112 and a preset protocol stack 113 that are sequentially disposed from a top layer to a bottom layer and that are equivalent to those in the first terminal protocol stack 11.

The adaptation layer 112 in the protocol stack on the side of the first interface 11-12 is configured to: implement a function of converting a data packet between a preset-protocol-based data packet and a cellular network data packet, and implement a function of configuring parameter information of the preset protocol stack 113.

The protocol stack on the side of the second interface 12-13 includes: a second radio link control (Radio Link Control, RLC) layer 114, a second MAC layer 115, and a second PHY layer 116 that are sequentially disposed from a top layer to a bottom layer. The adaptation layer 112 in the protocol stack on the side of the first interface 11-12 is further configured to implement a function of transmitting a data packet to the second RLC layer 114 in the protocol stack on the side of the second interface 12-13.

The network device protocol stack 13 includes: a cellular network PDCP layer 111 equivalent to the first terminal protocol stack 11, and a second RLC layer 114, a second MAC layer 115, and a second PHY layer 116 that are equivalent to the protocol stack on the side of the second interface 12-13, where the cellular network PDCP layer 111, the second RLC layer 114, the second MAC layer 115, and the second PHY layer 116 are sequentially disposed from a top layer to a bottom layer. The cellular network PDCP layer 111 is configured to implement a function of performing security processing concerted by the first terminal and the network device on a data packet. A data packet is transmitted between the second terminal and the network device through a cellular network communications link.

Optionally, a cellular network RLC layer 117 is disposed between the cellular network PDCP layer 111 and the adaptation layer 112 in the first terminal protocol stack 11.

A cellular network RLC layer 117 equivalent to the first terminal protocol stack 11 is disposed below a cellular network PDCP layer 111 in a protocol stack on a network side.

Optionally, a second PDCP layer 118 is disposed above the second RLC layer 114 of the second terminal protocol stack 12.

A second PDCP layer 118 equivalent to the second terminal protocol stack 12 is disposed between the cellular network PDCP layer 111 and the second RLC layer 114 of the network device protocol stack 13.

The second PDCP layer 118 is configured to implement a function of performing security processing concerted by the second terminal and the network device on a data packet.

Optionally, the adaptation layer 112 in the protocol stack on the side of the first interface 11-12 is further configured to implement a function of transmitting a data packet to the second PDCP layer 118 in the protocol stack on the side of the second interface 12-13.

Optionally, a cellular network MAC layer 120 is disposed below the cellular network PDCP layer 111 in a first protocol stack 11.

A cellular network MAC layer 120 equivalent to the first protocol stack 11 is disposed below the cellular network PDCP layer 111 of the network device protocol stack 13.

According to the user-plane protocol stack shown in FIG. 2a, for uplink transmission data, after performing security processing on a data packet from a cellular network module on the cellular network PDCP layer, the first terminal sends the data packet to the network device by using the second terminal. For downlink transmission data, after performing security processing on a data packet from a core network on the cellular network PDCP layer, the network device sends the data packet to the first terminal by using the second terminal.

The control-plane protocol stack 10 shown in FIG. 2b includes the first terminal protocol stack 11, the second terminal protocol stack 12, and the network device protocol stack 13. The following content is added to the control-plane protocol stack 10 shown in FIG. 2b based on the user-plane protocol stack 10 shown in FIG. 2a, as shown in FIG. 2b.

A cellular network RRC layer 119 is disposed above the cellular network PDCP layer 111 of the first terminal protocol stack 11, and a cellular network RRC layer 119 equivalent to the first terminal protocol stack 11 is disposed above the cellular network PDCP layer 111 of the network device protocol stack 13.

The cellular network RRC layer 119 is configured to: manage parameter configuration when the first terminal is connected to the network device, configure a security parameter for transmitting a data packet and signaling between the first terminal and the network device, and configure a bearer of the first terminal. The bearer of the first terminal includes a radio bearer connecting the first terminal to the network device and a bearer from the network device to the core network.

Figure 3A:
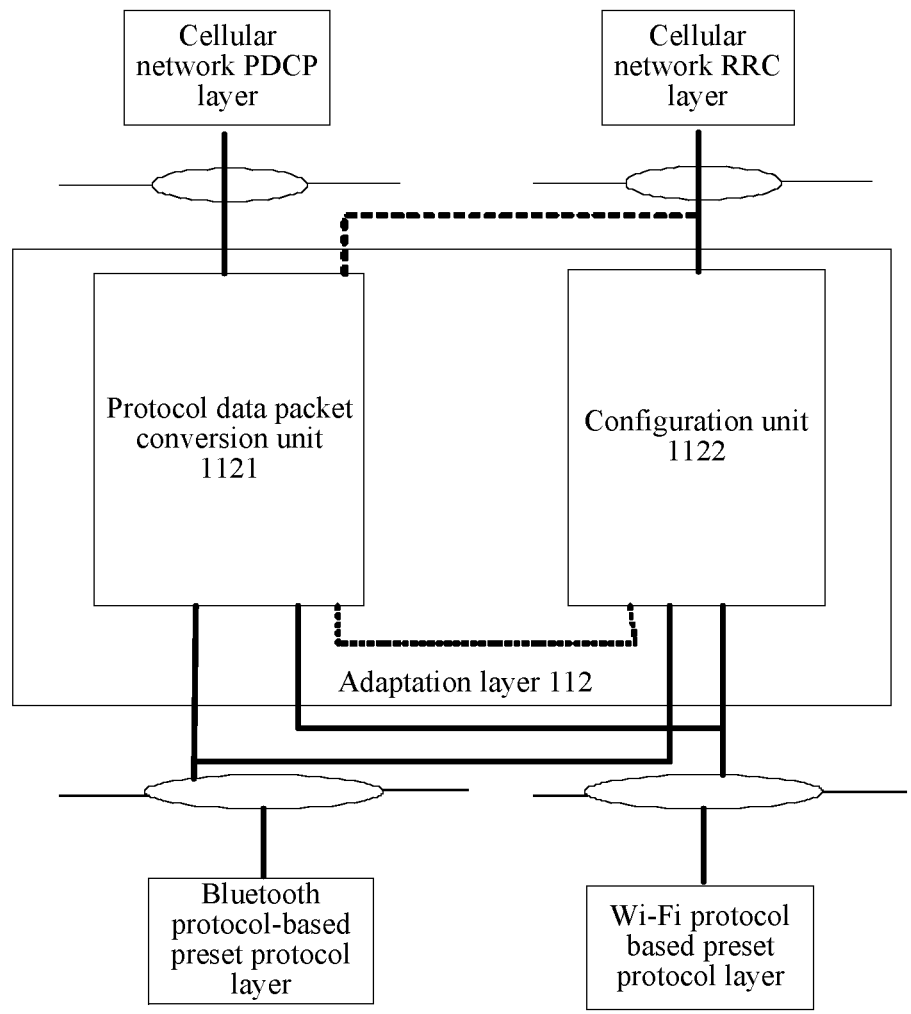
FIG. 3a is a schematic structural diagram of an adaptation layer in a protocol stack of a first terminal.

The adaptation layer 112 in the first terminal protocol stack is divided based on functions implemented by the adaptation layer 112. As shown in FIG. 3a, the adaptation layer 112 includes a protocol data packet conversion unit 1121 and a configuration unit 1122.

The protocol data packet conversion unit 1121 is configured to implement a function of converting a data packet between a Bluetooth protocol-based data packet and a cellular network data packet (that is, a cellular network protocol-based data packet), or a function of converting a data packet between a Wi-Fi protocol-based data packet and a cellular network data packet. Specifically, based on the Bluetooth protocol or the Wi-Fi protocol, the protocol data packet conversion unit 1121 performs byte order conversion on a data packet, and/or adds or deletes partial header content to or from the data packet. For uplink transmission data, the protocol data packet conversion unit 1121 converts a cellular network data packet generated by the cellular network module into a Wi-Fi protocol-based data packet or a Wi-Fi protocol-based data packet, so that the first terminal sends the converted data packet to the second terminal. For downlink transmission data, the protocol data packet conversion unit 1121 converts a Bluetooth protocol-based data packet or a Wi-Fi protocol-based data packet from the second terminal into a cellular network data packet, and submits the cellular network data packet to the cellular network module for further processing. A protocol layer of the cellular network module includes at least a cellular network RRC layer and/or a cellular network PDCP layer.

The configuration unit 1122 is configured to implement a function of configuring parameter information of the preset protocol stack 113, and may be further configured to implement a function of performing QoS class mapping on a data packet of a radio bearer. The configuration unit 1122 is configured to configure a parameter of each protocol layer in the Bluetooth protocol-based data packet or a Wi-Fi protocol-based preset protocol stack 113 based on bearer configuration information of a cellular network.

The radio bearer configuration information of the cellular network usually includes a configuration parameter of a cellular network RLC layer and/or a configuration parameter of a cellular network MAC layer. An objective of the configuration parameters is to guarantee reliable data transmission between a protocol transmit end and a receive end and guarantee a specific data transmission rate.

For example, a correspondence between the bearer configuration information of the cellular network and configuration information under the Bluetooth protocol is as follows:

When the cellular network RLC layer is configured to be in an acknowledge mode (AM), an L2CAP layer in the Bluetooth protocol-based preset protocol stack should be configured to be in a mode with acknowledgment from a receive end. When the cellular network MAC layer is configured with a guaranteed bit rate (GBR), a quantity of channels configured under the Bluetooth protocol should satisfy a value of the GBR.

Alternatively, the bearer configuration information of the cellular network includes a QoS class identifier (QCI). A value of the QCI corresponds to a data transmission rate and a data transmission mode under the Bluetooth protocol (including a transmission mode with acknowledgment, a transmission mode of retransmission, and a transmission mode without acknowledgment). A quantity of channels, a maximum value of a size of a data packet, a quantity of retransmissions, and the like of the L2CAP layer are configured according to the QCI.

Figure 3B:
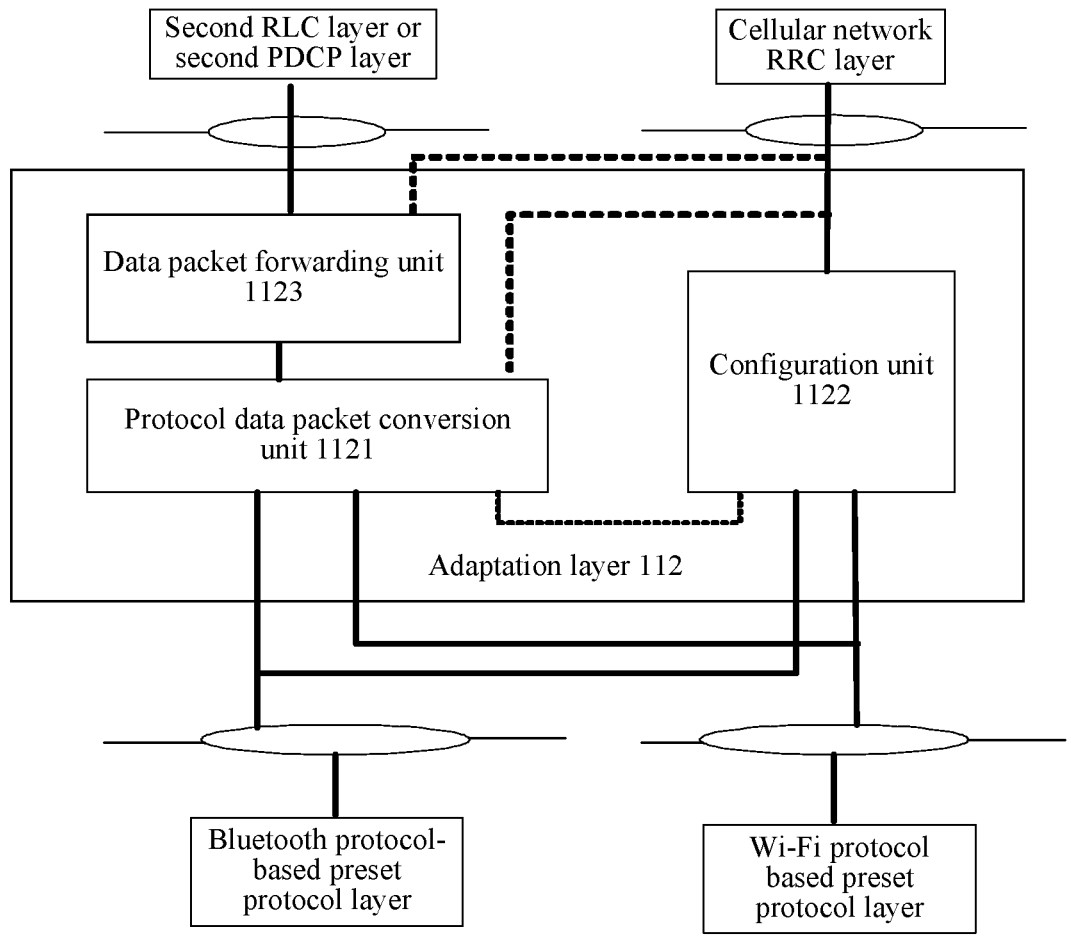
FIG. 3b is a schematic structural diagram of an adaptation layer in a protocol stack of a second terminal.

The adaptation layer 112 in the protocol stack on the side of the first interface of the second terminal protocol stack is divided based on functions implemented by the adaptation layer 112. As shown in FIG. 3b, the adaptation layer 112 includes a protocol data packet conversion unit 1121, a configuration unit 1122, and a data packet forwarding unit 1123.

The adaptation layer 112 shown in FIG. 3b differs from the adaptation layer 112 shown in FIG. 3a in that the data packet forwarding unit 1123 is added to the adaptation layer 112 shown in FIG. 3b. The data packet forwarding unit 1123 is configured to implement a function of transmitting, by the adaptation layer 112, a data packet to a second RLC layer or a second PDCP layer. For an uplink transmission data packet, the protocol data packet conversion unit 1121 converts a Bluetooth protocol-based data packet or a Wi-Fi protocol-based data packet from the first terminal into a cellular network data packet. The data packet forwarding unit 1123 transfers the cellular network data packet to the second RLC layer or the second PDCP layer, so that the second terminal sends the cellular network data packet to the network device. For a downlink transmission data packet, the data packet forwarding unit 1123 receives a cellular network data packet from the second RLC layer or the second PDCP layer, and the data packet forwarding unit 1123 transfers the cellular network data packet to the protocol data packet conversion unit 1121. The protocol data packet conversion unit 1121 converts the cellular network data packet into a Bluetooth protocol-based data packet or a Wi-Fi protocol-based data packet, so that the second terminal sends the Bluetooth protocol-based data packet or the Wi-Fi protocol-based data packet to the first terminal.

It should be noted that the adaptation layer in the protocol stack may be an independent entity, to implement a function of the adaptation layer. Alternatively, the function of the adaptation layer may be implemented by using another existing protocol layer. For example, the function of the configuration unit 1122 of the adaptation layer is implemented by using the cellular network RRC layer, and functions of the protocol data packet conversion unit 1121 and the data packet forwarding unit 1123 of the adaptation layer are implemented by using the cellular network PDCP layer.

The foregoing protocol stacks can enable the first terminal to communicate with the network device through the wireless connection to the second terminal, to enable receiving and transmitting parties to have consistent knowledge on a protocol type or a service attribute (for example, a PSM) of a data packet of an upper layer of a logical link control protocol layer or a Media Access Control layer in respective non-cellular network protocols without making a standardized change to the non-cellular network protocols.

With reference to the foregoing protocol stacks, a method for establishing a wireless connection provided in the embodiments of the present disclosure is described below in detail.

Figure 4:
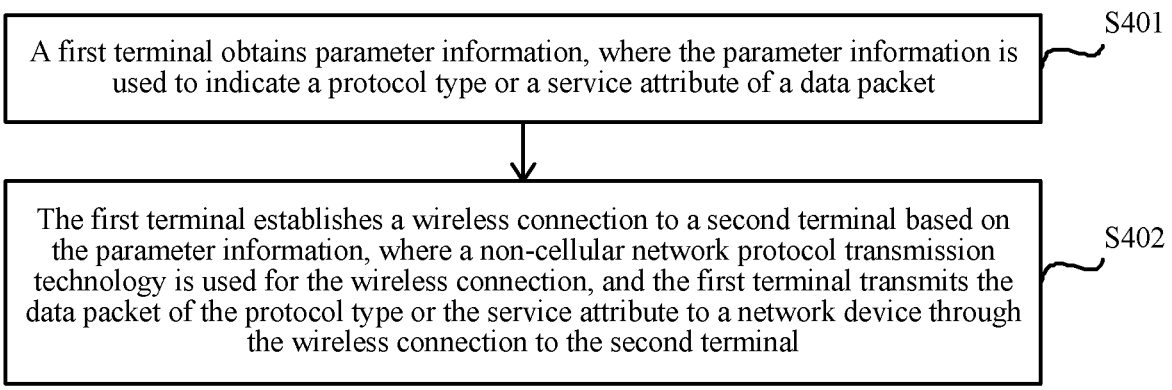
FIG. 4 is a flowchart of Embodiment 1 of a method for establishing a wireless connection according to the present disclosure.

FIG. 4 is a flowchart of Embodiment 1 of a method for establishing a wireless connection according to the present disclosure. This embodiment of the present disclosure provides a method for establishing a wireless connection. The method may be performed by a terminal (for example, a first terminal in this embodiment of the present disclosure). As shown in FIG. 4, the method for establishing a wireless connection includes the following steps.

S401: The first terminal obtains parameter information, where the parameter information is used to indicate a protocol type or a service attribute of a data packet.

The protocol type of the data packet may be understood as a type of a protocol used for generating the data packet. The service attribute of the data packet may be understood as a data packet transmitted in a service of an attribute.

It should be noted that the first terminal may obtain the parameter information in various manners: The first terminal may obtain the parameter information from another device. For example, a base station delivers the parameter information to the first terminal. Alternatively, the first terminal may generate the parameter information in advance and store the parameter information based on configuration information, and so on.

S402: The first terminal establishes a wireless connection to a second terminal based on the parameter information, where a non-cellular network protocol transmission technology is used for the wireless connection, and the first terminal transmits the data packet of the protocol type or the service attribute to a network device through the wireless connection to the second terminal.

The parameter information indicates the protocol type or the service attribute of the data packet. Therefore, after the first terminal establishes the wireless connection to the second terminal based on the parameter information, the first terminal can transmit the data packet of the protocol type or the service attribute indicated by the parameter information to the network device.

In a process in which the first terminal transmits the data packet to the network device through the wireless connection to the second terminal, both the first terminal and the second terminal have a data packet conversion function. The data packet conversion function is converting a transmitted data packet between a data packet based on the protocol type or the service attribute and a cellular network data packet. For example, the protocol data packet conversion unit 1121 shown in FIG. 3a is configured to implement a function of converting a data packet between a Bluetooth protocol-based data packet and a cellular network data packet (that is, a cellular network protocol-based data packet), or a function of converting a data packet between a Wi-Fi protocol-based data packet and a cellular network data packet.

Correspondingly, if a second terminal is an execution body, the second terminal establishes the wireless connection to a first terminal.

When the wireless connection between the first terminal and the second terminal needs to support transmission of data packets of a plurality of protocols. The data packets of a plurality of protocol types or service attributes need to be capable of being processed by modules capable of processing corresponding protocols in a terminal. Therefore, a logical link control protocol layer or Media Access Control layer of the wireless connection needs to learn of a protocol type to which each data packet belongs, so as to submit the data packet to a corresponding protocol module entity for processing. Therefore, a field is set in a header of a data packet on the logical link control protocol layer or Media Access Control layer to indicate a protocol type corresponding to a service protocol data unit of the data packet. Alternatively, a channel of the logical link control protocol layer or Media Access Control layer is merely configured to notify a peer end (a receive end or a transmit end) when transmitting a data packet of the protocol type. To enable both the receive end and the transmit end of a data packet to correctly parse a data packet of a protocol type, standardized definition needs to be performed on a protocol type in a header of a data packet on the logical link control protocol layer or Media Access Control layer. To be specific, if a service protocol data unit of the logical link control protocol layer or Media Access Control layer of the wireless connection corresponds to N protocols, a header of a data packet of the Media Access Control layer needs to have N values. Alternatively, both the receive end and the transmit end transmit multiplexing indication information by using a dedicated channel, to indicate correspondences between channel numbers of the receive end and the transmit end and protocol types or service attributes. In this embodiment of the present disclosure, a support service protocol type is added to a logical link control protocol layer or Media Access Control layer of an existing wireless connection.

In an existing technology, a definition of a service protocol type is added to standardized text of the protocol, and the added definition is referred to as a standardized change. However, after the standardized change is made, existing devices that have been produced cannot support such an added attribute, and forward compatibility cannot be achieved.

In this embodiment of the present disclosure, the first terminal establishes the wireless connection to the second terminal, and the non-cellular network protocol transmission technology is used for the wireless connection, so that the first terminal transmits, through the wireless connection to the second terminal, the data packet of the protocol type or the service attribute that can be recognized by the network device to the network device, to enable receiving and transmitting parties, namely, the first terminal and the second terminal, to have consistent knowledge on a protocol type or a service attribute (for example, a PSM) of a data packet of a top layer of a logical link control protocol layer or a Media Access Control layer in respective non-cellular network protocols without making a standardized change to the non-cellular network protocols.

In the foregoing embodiment, the parameter information may include at least any one of PSM values corresponding to a cellular network protocol service identifier, a version number of a cellular network protocol, and a cellular network protocol type. The cellular network protocol service identifier, the version number of the cellular network protocol, or the cellular network protocol type corresponds to at least one PSM value.

Several specific embodiments are used below based on different implementations of obtaining parameter information by a first terminal, to describe the technical solution of the method embodiment shown in FIG. 4 in detail.

Figure 5:
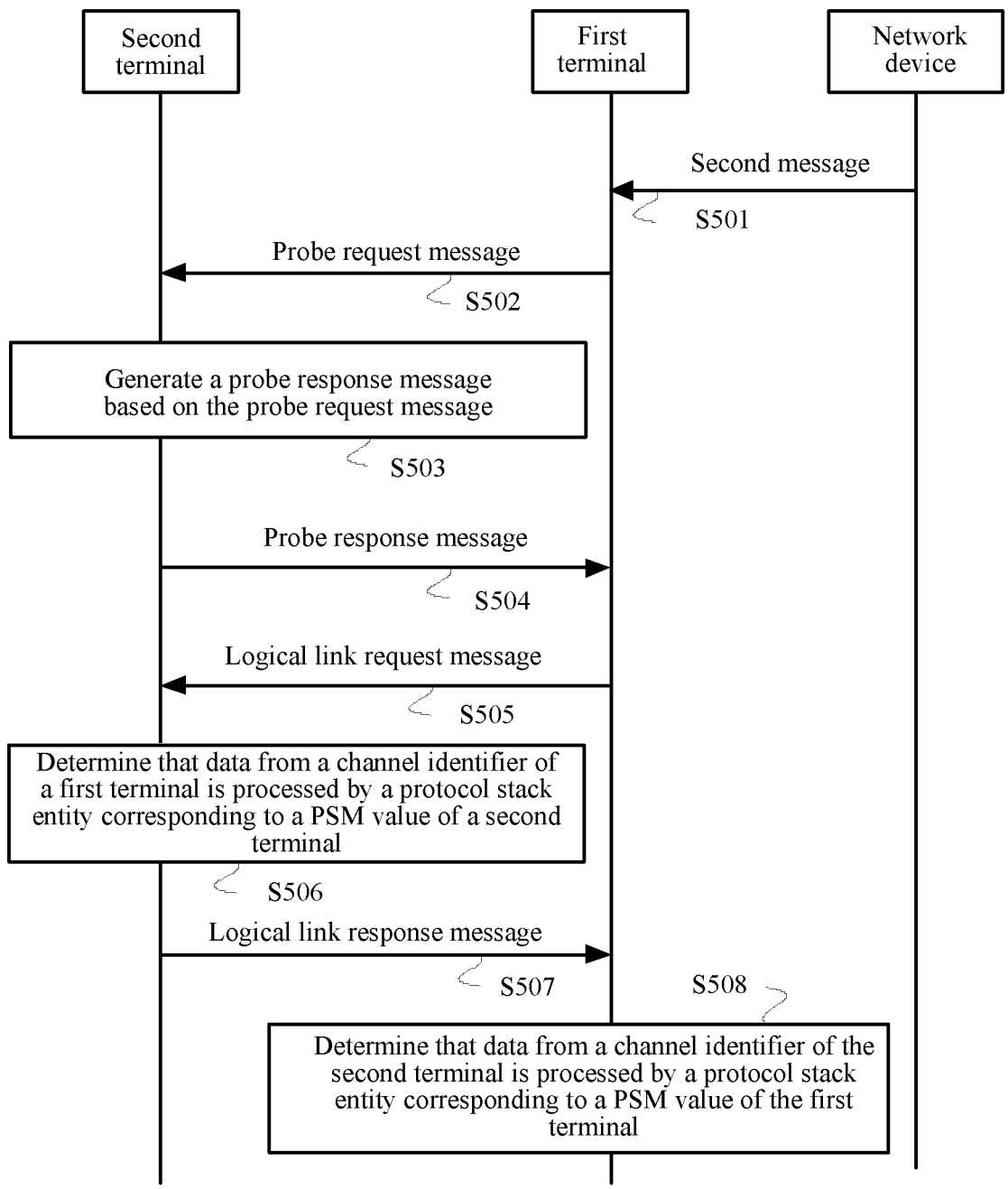
FIG. 5 is a flowchart of signaling exchange of Embodiment 2 of a method for establishing a wireless connection according to the present disclosure.

In a first implementation, referring to FIG. 5, the obtaining, by a first terminal, parameter information may include the following step: S501: The first terminal receives a second message sent by a network device.

The network device may include an access network device, a core network device, and the like. Specifically, the first terminal receives an RRC message sent by the access network device. The RRC message carries the foregoing parameter information, and the RRC message may include a system broadcast message or includes independent signaling for the first terminal. For example, the RRC message is a system broadcast message including a system information block (SIB) (for example, an SIB 25). The SIB 25 carries the foregoing parameter information. Alternatively, the first device receives an NAS message sent by a core network device. The NAS message carries the foregoing parameter information. Optionally, the parameter information is carried in a Bluetooth parameter cell block (BT parameter cell block) of the NAS message. The access network device includes a base station, an access network control unit, and the like. The core network device includes a resource negotiation unit (Resource Control Unit, RCU). The access network control unit is, for example, a radio network controller (RNC).

For example, when a terminal (including the first terminal and the second terminal) resides in a coverage area of a base station, the terminal receives a system broadcast message that is sent by the base station and that includes the SIB 25. Optionally, the terminal stores content, including parameter information and the like, carried in the system broadcast message.

A signaling exchange process shown in FIG. 5 is described by using an example in which a non-cellular network protocol transmission technology is a Bluetooth technology, but the embodiments of the present disclosure are not limited thereto.

The establishing, by a first terminal, a wireless connection to a second terminal based on parameter information may include the following steps.

S502: The first terminal sends a probe request message when the first terminal detects that a Bluetooth function of the first terminal is enabled.

The probe request message carries an identifier of the first terminal and the parameter information of the protocol or service attribute of the data packet of the first terminal.

Correspondingly, the second terminal receives the probe request message sent by the first terminal.

Specifically, when a Bluetooth function included by a terminal (the first terminal and the second terminal) is enabled, the terminal sends a probe request message to find another terminal that can be paired with the terminal, and a Bluetooth function of the another terminal is also in an enabled state. The probe request message carries parameter information for notifying another terminal: when a protocol type supported by an upper layer of an L2CAP layer of the probe request message is a version of a cellular network protocol, a PSM value is xxx, where xxx can represent any value. In this way, a terminal receiving the probe request message can learn of a PSM value of a cellular protocol supported by a terminal sending the probe request message.

A Rel-14 LTE system is used as an example to show that a PSM value is obtained in a scanning and discovering process of a terminal.

The first terminal stores that a PSM value of LTE R14 supported by the first terminal is 0xF001, a name of a service is LTE R14 (ASCII), and UUID=0xFFEF. When the first terminal detects that the Bluetooth function of the first terminal is enabled, the first terminal sends a probe request message. The probe request message carries the foregoing content of the first terminal. Another terminal (including the second terminal) receiving the probe request message can record the foregoing content of the first terminal: a BT device 001 supports LTE R14, and PSM=0xF001. The "BT device 001" is used to represent an identifier of the first terminal.

Similarly, when the second terminal stores that a PSM value of LTE R14 supported by the second terminal is 0xF009, a name of a service is LTE R14(ASCII), and UUID=0xFFEF. When the second terminal detects that the Bluetooth function of the second terminal is enabled, the second terminal sends a probe request message. The probe request message carries the foregoing content of the second terminal. Another terminal (including the first terminal) receiving the probe request message can record the foregoing content of the second terminal: a BT device 002 supports LTE R14, and PSM=0xF009. The "BT device 002" is used to represent an identifier of the second terminal.

S503: The second terminal generates a probe response message based on the probe request message.

The probe response message carries the identifier of the second terminal.

S504: The first terminal receives the probe response message sent by the second terminal.

S505: The first terminal sends a logical link request message to the second terminal.

The logical link request message carries a channel identifier of the first terminal and a PSM value of the first terminal. For example, the channel identifier of the first terminal is: channelID=0x2800; and the PSM value of the first terminal is: PSM=0xF001. The first terminal allocates a channel identifier, for example, channelID=0x2800, to a message sending channel of an LTE R14 protocol stack entity of the first terminal in advance, to indicate that a protocol type of data from a 0x2800 channel is 0xF001, that is, LTE R14.

Correspondingly, the second terminal receives the logical link request message sent by the first terminal. Optionally, the second terminal stores the channel identifier of the first terminal.

S506: The second terminal determines that data from the channel identifier of the first terminal is processed by a protocol stack entity corresponding to a PSM value of the second terminal.

For example, the second terminal determines that data from channelID=0x2800 is processed by a protocol stack entity corresponding to LTE R14.

S507: The second terminal sends a logical link response message to the first terminal.

The logical link response message carries a channel identifier of the second terminal and the channel identifier of the first terminal. The channel identifier of the second terminal is used to instruct the first terminal to submit data from the channel identifier of the second terminal to a protocol stack entity corresponding to the PSM value of the first terminal for processing. For example, the second terminal allocates a channel identifier, for example, channelID=0x1900, to a message sending channel of an LTE R14 protocol stack entity of the second terminal.

Correspondingly, the first terminal receives the logical link response message sent by the second terminal.

S508: The first terminal determines that the data from the channel identifier of the second terminal is processed by the protocol stack entity corresponding to the PSM value of the first terminal.

For example, the first terminal determines that data from channelID=0x1900 is processed by the protocol stack entity corresponding to LTE R14.

Through the foregoing S502 to S508, the first terminal and the second terminal can respectively send/receive a data packet supporting a cellular network protocol of LTE R14 of a peer end by using respective L2CAP layers. An adaptation layer of the second terminal receives an RRC message or a PDCP data packet sent by the first terminal from a Bluetooth protocol-based L2CAP layer, and then processes the RRC message or the PDCP data packet based on a function of the adaptation layer. Similarly, after receiving, from a base station, a data packet that needs to be sent to the first terminal, the second terminal may alternatively process the data packet on the adaptation layer of the second terminal, and then, transfer the data packet to the L2CAP layer with channelID=0x1900 for processing and sending. After receiving the data packet from channelID=0x1900 of the second terminal, the first terminal sends the data packet based on a correspondence between a channel identifier and a PSM value to an adaptation layer (inside the first terminal) entity supporting a cellular network protocol of LTE R14 for processing.

Optionally, in this embodiment of the present disclosure, the parameter information may further include a correspondence between a QoS parameter in the cellular network protocol and an L2CAP parameter in the Bluetooth technology. Further, the parameter information may further include indication information indicating that a terminal (including the first terminal and the second terminal) may serve as a server (server), or indication information indicating that a terminal may serve as a server (server) and a client (client).

Figure 6:
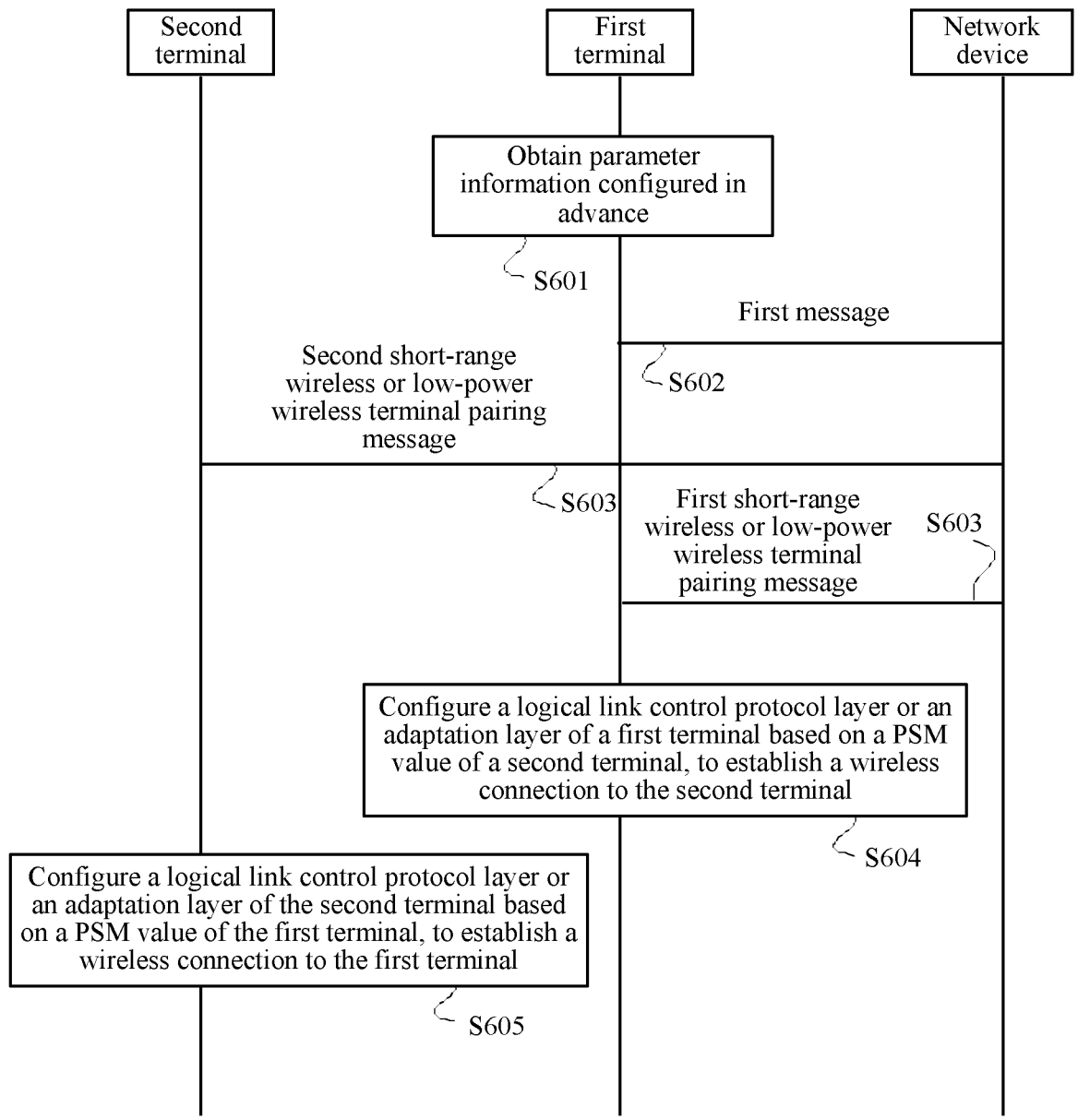
FIG. 6 is a flowchart of signaling exchange of Embodiment 3 of a method for establishing a wireless connection according to the present disclosure.

In a second implementation, referring to FIG. 6, the obtaining, by a first terminal, parameter information may include the following step: S601: The first terminal obtains the parameter information configured in advance.

This implementation differs from the first implementation in that in the first implementation, the first terminal obtains the parameter information from a network device, and in the second implementation, the first terminal generates the parameter information.

In this implementation, the establishing, by a first terminal, a wireless connection to a second terminal based on parameter information may include the following steps.

S602: The first terminal sends a first message to the network device when the first terminal detects that a short-range wireless or low-power wireless function of the first terminal is enabled and detects the second terminal on a short-range wireless or low-power wireless channel.

The first message carries an identifier of the second terminal. The first message is used to instruct the first terminal to find the second terminal to which the wireless connection is to be established. A connection, for example, a cellular network connection, between the first terminal and the network device has been established. The first message may be an RRC message, a control message of a MAC layer, or the like.

In addition, the short-range wireless or low-power wireless function includes, but is not limited to, a Wi-Fi function, a Wireless Fidelity Direct (Wi-Fi direct) function, a BLE function, a BT function, a ZigBee function, and the like.

Optionally, the first message may further include: a serving cell identifier of the second terminal.

Further, the first message may further include: a PSM value of the first terminal. The PSM value of the first terminal is used to indicate that an upper-layer data protocol of a logical link control protocol layer of a short-range wireless or low-power wireless technology in the first terminal is a cellular network protocol.

S603: The network device sends a first short-range wireless or low-power wireless terminal pairing message to the first terminal; and the network device sends a second short-range wireless or low-power wireless terminal pairing message to the second terminal.

The first short-range wireless or low-power wireless terminal pairing message carries at least a PSM value of the second terminal. The PSM value of the second terminal is used to indicate that an upper-layer data protocol of a logical link control protocol layer of a short-range wireless or low-power wireless technology in the second terminal is a cellular network protocol or that the PSM value of the second terminal is in a one-to-one correspondence with a cellular RB.

The second short-range wireless or low-power wireless terminal pairing message carries at least a PSM value of the first terminal. The PSM value of the first terminal is used to indicate that an upper-layer data protocol of a logical link control protocol layer of a short-range wireless or low-power wireless technology in the first terminal is a cellular network protocol or that the PSM value of the first terminal is in a one-to-one correspondence with a cellular RB.

When there are a plurality of cellular RB connections between a terminal (including the first terminal and the second terminal) and a base station, a PSM value is allocated to a protocol entity of each cellular RB. In this way, a data packet header of the terminal or each Bluetooth channel corresponds to a PSM value.

Correspondingly, the first terminal receives the first short-range wireless or low-power wireless terminal pairing message sent by the network device; and the second terminal receives the second short-range wireless or low-power wireless terminal pairing message sent by the network device.

S604: The first terminal configures a logical link control protocol layer or an adaptation layer of the first terminal based on the PSM value of the second terminal, to establish the wireless connection to the second terminal.

This step is based on the Bluetooth protocol.

Alternatively, this step may be replaced with: the first terminal configures a MAC layer or an adaptation layer of the first terminal based on the PSM value of the second terminal, to establish the wireless connection to the second terminal. In this case, this step is based on the Wi-Fi protocol.

In addition, the establishing, by a second terminal, a wireless connection to a first terminal may include the following step: S605: The second terminal configures a logical link control protocol layer or an adaptation layer of the second terminal based on the PSM value of the first terminal, to establish the wireless connection to the first terminal.

Similarly, S605 is based on the Bluetooth protocol.

Alternatively, this step may be replaced with: the second terminal configures a MAC layer or an adaptation layer of the second terminal based on the PSM value of the first terminal, to establish the wireless connection to the first terminal. In this case, this step is based on the Wi-Fi protocol.

Referring to FIG. 2a, FIG. 2b, FIG. 3a, and FIG. 3b, a Bluetooth protocol-based L2CAP layer is configured on an RRC layer of the first terminal or the second terminal, or an adaptation layer is configured on an RRC layer, to enable the adaptation layer and the Bluetooth protocol-based L2CAP layer to interact with each other. Alternatively, a Wi-Fi protocol-based MAC layer is configured on an RRC layer of the first terminal or the second terminal, or an adaptation layer is configured on an RRC layer, to enable the adaptation layer and the Wi-Fi protocol-based MAC layer to interact with each other.

In this embodiment of the present disclosure, because the PSM value is directly configured for a peer-end terminal through a cellular network link between a terminal and a network device. To be specific, the PSM value of the first terminal is configured for the second terminal, and the PSM value of the second terminal is configured for the first terminal. Therefore, the wireless connection between the first terminal and the second terminal is established according to the requirements, and a situation that a data packet cannot be correctly processed because the first terminal and the second terminal have different descriptions on the PSM value of a same supported protocol will not occur.

It should also be noted that the cellular network protocol in this embodiment of the present disclosure includes, but is not limited to, 2G, 3G, and 4G protocol types already in commercial use, and further includes a 5G protocol type, and the like.

Figure 7:
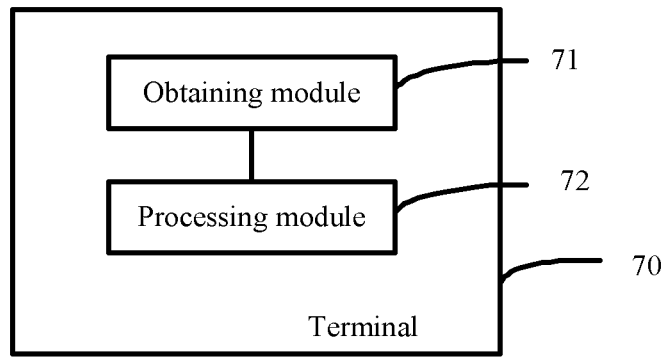
FIG. 7 is a schematic structural diagram of Embodiment 1 of a terminal according to the present disclosure.

FIG. 7 is a schematic structural diagram of Embodiment 1 of a terminal according to the present disclosure. This embodiment of the present disclosure provides a terminal. The terminal may serve as a first terminal. As shown in FIG. 7, a terminal 70 includes an obtaining module 71 and a processing module 72.

The obtaining module 71 is configured to obtain parameter information, where the parameter information is used to indicate a protocol type or a service attribute of a data packet. The processing module 72 is configured to establish a wireless connection to a second terminal based on the parameter information, where a non-cellular network protocol transmission technology is used for the wireless connection, and the first terminal transmits the data packet of the protocol type or the service attribute to a network device through the wireless connection to the second terminal.

The terminal in this embodiment may be used to execute the technical solution of the method embodiment shown in FIG. 4, and their implementation principles and technical effects are similar, which are not described in detail herein again.

The obtaining module 71 may obtain the parameter information through various implementations:

In a first implementation, the obtaining module 71 may be specifically configured to receive an RRC message sent by an access network device. The RRC message carries the parameter information. The RRC message may include a system broadcast message, independent signaling for the first terminal, or the like.

In a second implementation, the obtaining module 71 may be specifically configured to: receive an NAS message sent by a core network device, where the NAS message carries the parameter information.

In a third implementation, the obtaining module 71 may be specifically configured to: obtain the parameter information configured in advance.

Based on the first and the second implementations, there is the following specific embodiment:

When the non-cellular network protocol transmission technology is a Bluetooth technology, the processing module 72 may be specifically configured to: send a probe request message when the first terminal detects that a Bluetooth function of the first terminal is enabled, where the probe request message carries an identifier of the first terminal and the parameter information of the protocol or service attribute of the data packet of the first terminal; receive a probe response message sent by the second terminal, where the probe response message is generated after the second terminal detects the probe request message, and the probe response message carries an identifier of the second terminal; send a logical link request message to the second terminal, where the logical link request message carries a channel identifier of the first terminal and a PSM value of the first terminal; receive a logical link response message sent by the second terminal, where the logical link response message carries a channel identifier of the second terminal and the channel identifier of the first terminal; and determine that data from the channel identifier of the second terminal is processed by a protocol stack entity corresponding to the PSM value of the first terminal.

Optionally, the parameter information may further include a correspondence between a QoS parameter in a cellular network protocol and an L2CAP parameter in the Bluetooth technology.

Based on the third implementation, there is the following specific embodiment:

Optionally, the processing module 72 may be specifically configured to: send a first message to the network device when the first terminal detects that a short-range wireless or low-power wireless function of the first terminal is enabled and detects the second terminal on a short-range wireless or low-power wireless channel, where the first message carries the identifier of the second terminal, and the first message is used to instruct the first terminal to find the second terminal to which the wireless connection is to be established, and a connection between the first terminal and the network device has been established; receive a first short-range wireless or low-power wireless terminal pairing message sent by the network device, where the first short-range wireless or low-power wireless terminal pairing message carries at least a PSM value of the second terminal, and the PSM value of the second terminal is used to indicate that an upper-layer data protocol of a logical link control protocol layer of a short-range wireless or low-power wireless technology in the second terminal is a cellular network protocol or that the PSM value of the second terminal is in a one-to-one correspondence with a cellular RB; and configure a logical link control protocol layer, an adaptation layer, or a Media Access Control layer of the first terminal based on the PSM value of the second terminal, to establish the wireless connection to the second terminal.

Further, the first message may further include a serving cell identifier of the second terminal.

In addition, the first message may further include: the PSM value of the first terminal, and the PSM value of the first terminal is used to indicate that an upper-layer data protocol of a logical link control protocol layer of a short-range wireless or low-power wireless technology in the first terminal is a cellular network protocol.

Figure 8:
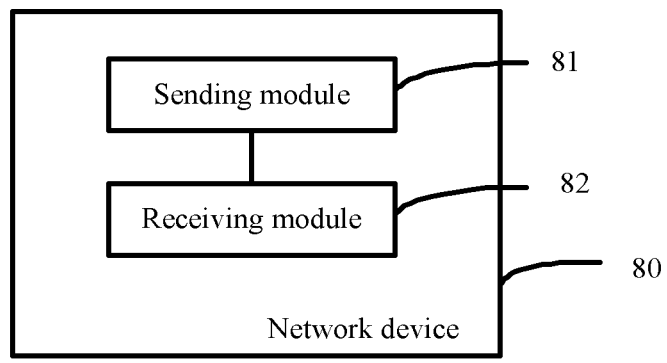
FIG. 8 is a schematic structural diagram of Embodiment 1 of a network device according to the present disclosure.

FIG. 8 is a schematic structural diagram of Embodiment 1 of a network device according to the present disclosure. As shown in FIG. 8, the network device 80 includes a sending module 81 and a receiving module 82. The receiving module 82 is an optional module.

The network device in this embodiment may be configured to perform the technical solution of any one of the foregoing method embodiments on a network device side. Their implementation principles and technical effects are similar, and details are not described herein again.

In an implementation, the sending module 81 is configured to send a second message to a first terminal. The second message carries at least parameter information, where the parameter information is used to indicate a protocol type or a service attribute of a data packet. The second message is used to instruct the first terminal to establish a wireless connection to a second terminal based on the parameter information. A non-cellular protocol transmission technology is used for the wireless connection between the first terminal and the second terminal, and the first terminal transmits the data packet of the protocol type or the service attribute to the network device through the wireless connection to the second terminal.

When the network device is an access network device, the sending module 81 may be specifically configured to send an RRC message to the first terminal. The RRC message carries the parameter information. The RRC message may include a system broadcast message, independent signaling for the first terminal, or the like.

Alternatively, when the network device is a core network device, the sending module 81 may be specifically configured to send an NAS message to a first device. The NAS message carries the parameter information.

Optionally, the parameter information may further include a correspondence between a QoS parameter in the cellular network protocol and an L2CAP parameter in the Bluetooth technology.

In another implementation, the receiving module 82 is configured to receive a first message sent by the first terminal, where the first message carries an identifier of the second terminal, and the first message is used to instruct the first terminal to find the second terminal to which the wireless connection is to be established, and the connection between the first terminal and the network device has been established. The sending module 81 is configured to send a first short-range wireless or low-power wireless terminal pairing message to the first terminal, where the first short-range wireless or low-power wireless terminal pairing message carries at least a PSM value of the second terminal, and the PSM value of the second terminal is used to indicate that an upper-layer data protocol of a logical link control protocol layer of a short-range wireless or low-power wireless technology in the second terminal is a cellular network protocol or that the PSM value of the second terminal is in a one-to-one correspondence with a cellular RB; and the first short-range wireless or low-power wireless terminal pairing message is used to instruct the first terminal to configure a logical link control protocol layer, an adaptation layer, or a Media Access Control layer of the first terminal based on the PSM value of the second terminal, to establish the wireless connection to the second terminal.

Optionally, the first message may further include a serving cell identifier of the second terminal.

Further, the first message may further include a PSM value of the first terminal, and the PSM value of the first terminal is used to indicate that an upper-layer data protocol of a logical link control protocol layer of a short-range wireless or low-power wireless technology in the first terminal is a cellular network protocol.

Still further, the sending module 81 may further be configured to send a second short-range wireless or low-power wireless terminal pairing message to the second terminal. The second short-range wireless or low-power wireless terminal pairing message carries at least the PSM value of the first terminal. The PSM value of the first terminal is used to indicate that the upper-layer data protocol of the logical link control protocol layer of the short-range wireless or low-power wireless technology in the first terminal is a cellular network protocol or that the PSM value of the first terminal is in a one-to-one correspondence with a cellular RB. The second short-range wireless or low-power wireless terminal pairing message is used to instruct the second terminal to configure a logical link control protocol layer, an adaptation layer, or a Media Access Control layer of the second terminal based on the PSM value of the first terminal, to establish the wireless connection to the first terminal.

Referring to FIG. 7, an embodiment of the present disclosure further provides a terminal. The terminal may serve as a second terminal. In this case, an obtaining module 71 is an optional module, and a processing module 72 is configured to establish a wireless connection to a first terminal. A non-cellular network protocol transmission technology is used for the wireless connection, and the first terminal transmits a data packet of a protocol type or a service attribute indicated by parameter information to a network device through the wireless connection to the second terminal.

The terminal in this embodiment may be configured to perform the technical solution of any one of the foregoing method embodiments on a second terminal side. Their implementation principles and technical effects are similar, and details are not described herein again.

When the non-cellular network protocol transmission technology is a Bluetooth technology, the processing module 72 may be specifically configured to: receive a probe request message sent by the first terminal, where the probe request message carries an identifier of the first terminal and the parameter information of the protocol or service attribute of the data packet of the first terminal; generate a probe response message based on the probe request message, where the probe response message carries an identifier of the second terminal; send the probe response message to the first terminal; receive a logical link request message sent by the first terminal, where the logical link request message carries a channel identifier of the first terminal and a PSM value of the first terminal; determine that data from the channel identifier of the first terminal is processed by a protocol stack entity corresponding to a PSM value of the second terminal; and send a logical link response message to the first terminal, where the logical link response message carries a channel identifier of the second terminal and the channel identifier of the first terminal, and the channel identifier of the second terminal is used to instruct the first terminal to submit data from the channel identifier of the second terminal to a protocol stack entity corresponding to the PSM value of the first terminal for processing.

Optionally, the parameter information may further include a correspondence between a QoS parameter in the cellular network protocol and an L2CAP parameter in the Bluetooth technology.

Optionally, the processing module 72 may be specifically configured to receive a second short-range wireless or low-power wireless terminal pairing message sent by the network device, where the second short-range wireless or low-power wireless terminal pairing message carries at least the PSM value of the first terminal, and the PSM value of the first terminal is used to indicate that an upper-layer data protocol of a logical link control protocol layer of a short-range wireless or low-power wireless technology in the first terminal is a cellular network protocol or that the PSM value of the first terminal is in a one-to-one correspondence with a cellular RB; and configure a logical link control protocol layer, an adaptation layer, or a Media Access Control layer of the second terminal based on the PSM value of the first terminal, to establish the wireless connection to the first terminal.

In the foregoing embodiment, the parameter information may include at least any one of PSM values corresponding to a cellular network protocol service identifier, a version number of a cellular network protocol, and a cellular network protocol type, and the cellular network protocol service identifier, the version number of the cellular network protocol, or the cellular network protocol type corresponds to at least one PSM value.

It should also be noted that functions of an obtaining module and a processing module in the embodiments of the present disclosure can be implemented by a processor in a corresponding terminal or network device. A function of a sending module may be specifically implemented by a transmitter in a corresponding terminal or network device. A function of a receiving module may be specifically implemented by a receiver in a corresponding terminal or network device. For details, refer to the foregoing apparatus embodiments. The transmitter and the receiver may be set independently, or may be integrated into a transceiver.

Figure 9:
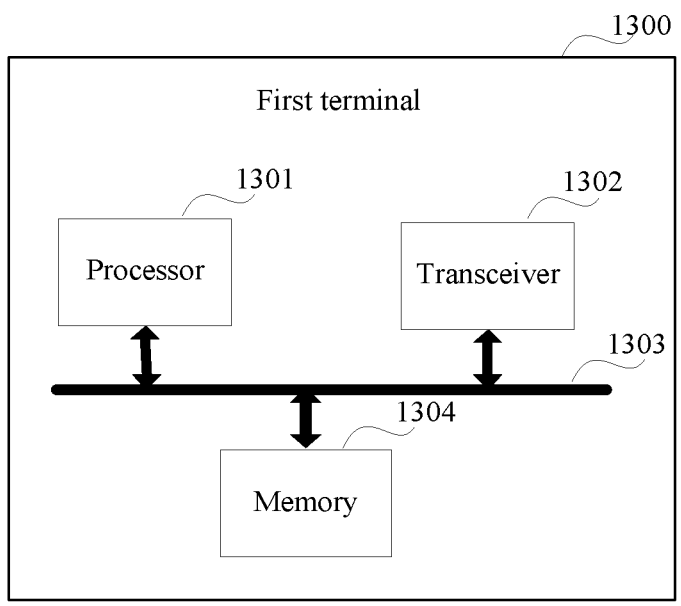
FIG. 9 is a schematic structural diagram of Embodiment 1 of a first terminal according to the present disclosure.

Based on the foregoing embodiment, an embodiment of the present disclosure further provides a first terminal. The method provided in the embodiment corresponding to the foregoing first terminal may be used in the first terminal, and the first terminal may be a device the same as the first terminal shown in FIG. 7. Referring to FIG. 9, the first terminal 1300 includes: a processor 1301, a transceiver 1302, a bus 1303, and a memory 1304.

The processor 1301, the transceiver 1302, and the memory 1304 are connected to each other through the bus 1303. The bus 1303 may be a peripheral component interconnect (PCI) bus, an extended industry standard architecture (EISA) bus, or the like. The bus may be categorized as an address bus, a data bus, a control bus, or the like. For convenience of indication, the bus is indicated by only one bold line in FIG. 9, but it does not indicate that there is only one bus or only one type of bus.

In the first terminal 1300, the processor 1301 corresponds to a unit that needs to have a processing function in the first terminal, and the transceiver 1302 corresponds to a unit that needs to have a data receiving function and a data sending function in the first terminal. The memory 1304 is configured to store a program and the like. Specifically, the program may include program code, and the program code includes a computer operation instruction. The memory 1304 may include a random access memory (RAM) or may further include a non-volatile memory, for example, at least one magnetic disk memory. The processor 1301 executes an application program stored in the memory 1304, to perform the method for establishing a wireless connection described above.

Figure 10:
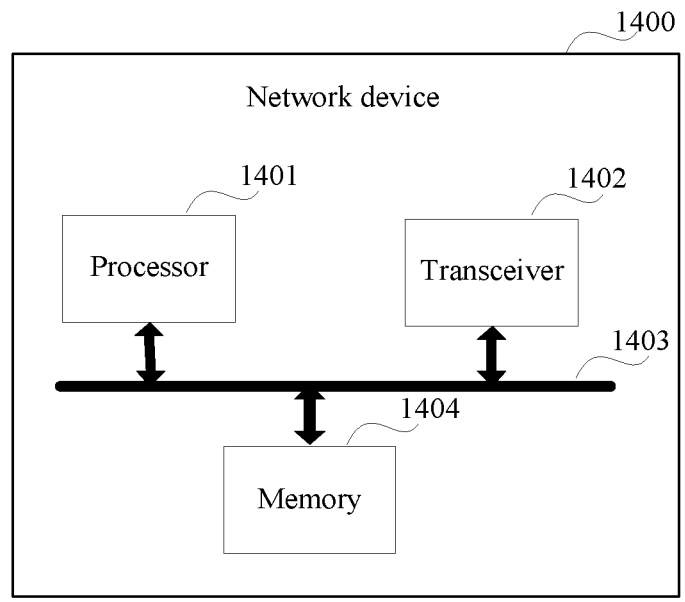
FIG. 10 is a schematic structural diagram of Embodiment 2 of a network device according to the present disclosure.

Based on the foregoing embodiment, an embodiment of the present disclosure further provides a network device. The method provided in the embodiment corresponding to the network device may be used in the network device, and the network device may be a device the same as the network device shown in FIG. 8. Referring to FIG. 10, the network device 1400 includes: a processor 1401, a transceiver 1402, a bus 1403, and a memory 1404.

The processor 1401, the transceiver 1402, and the memory 1404 are connected to each other through the bus 1403. The bus 1403 may be a PCI bus, an EISA bus, or the like. The bus may be categorized as an address bus, a data bus, a control bus, or the like. For convenience of indication, the bus is indicated by only one bold line in FIG. 10, but it does not indicate that there is only one bus or only one type of bus.

In the network device 1400, the processor 1401 corresponds to a unit that needs to have a processing function in the network device, and the transceiver 1402 corresponds to a unit that needs to have a data receiving function and a data sending function in the network device. The memory 1404 is configured to store a program. Specifically, the program may include program code, and the program code includes a computer operation instruction. The memory 1404 may include a RAM, may further include a non-volatile memory, for example, at least one magnetic disk memory. The processor 1401 executes an application program stored in the memory 1404, to perform the method for establishing a wireless connection described above.

Figure 11:
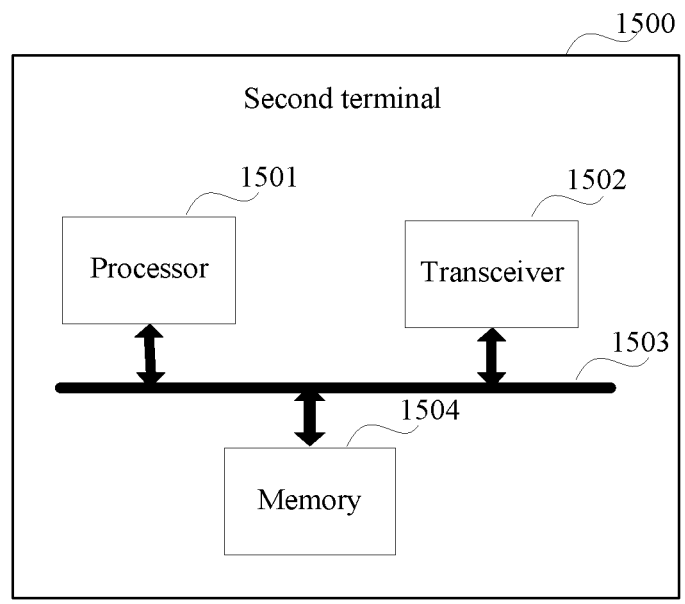
FIG. 11 is a schematic structural diagram of Embodiment 1 of a second terminal according to the present disclosure.

Based on the foregoing embodiments, an embodiment of the present disclosure further provides a second terminal, and a method provided in the embodiment corresponding to the second terminal can be used in the second terminal. Referring to FIG. 11, the second terminal 1500 includes: a processor 1501, a transceiver 1502, a bus 1503, and a memory 1504.

The processor 1501, the transceiver 1502, and the memory 1504 are connected to each other through the bus 1503. The bus 1503 may be a PCI bus, an EISA bus, or the like. The bus may be categorized as an address bus, a data bus, a control bus, or the like. For convenience of indication, the bus is indicated by only one bold line in FIG. 11, but it does not indicate that there is only one bus or only one type of bus.

In the second terminal 1500, the processor 1501 corresponds to a unit that needs to have a processing function in the second terminal, and the transceiver 1502 corresponds to a unit that needs to have a data receiving function and a data sending function in the second terminal. The memory 1504 is configured to store a program. Specifically, the program may include program code, and the program code includes a computer operation instruction. The memory 1504 may include a RAM, may further include a non-volatile memory, for example, at least one magnetic disk memory. The processor 1501 executes an application program stored in the memory 1504, to perform the method for establishing a wireless connection described above.

In the several embodiments provided in this application, it should be understood that the disclosed device and method may be implemented in another manner. For example, the described device embodiment is merely an example. For example, the unit or unit division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented through some interfaces. The indirect couplings or communication connections between the devices or modules may be implemented in electrical, mechanical, or other forms.

The modules described as separate parts may or may not be physically separate, and parts displayed as modules may or may not be physical modules, may be located in one position, or may be distributed on multiple network units. Some or all of the modules may be selected according to actual needs to achieve the objectives of the solutions of the embodiments.

Persons of ordinary skill in the art may understand that all or some of the steps of the method embodiments may be implemented by a program instructing relevant hardware. The program may be stored in a non-transitory (non-transitory) computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for establishing a wireless connection, the method comprising:
    obtaining, by a first terminal, parameter information for indicating a type of a protocol or a service attribute of a data packet; and
    establishing, by the first terminal, a wireless connection to a second terminal based on the parameter information, wherein a non-cellular network protocol transmission technology is used for the wireless connection, and the first terminal transmits the data packet of the type of the protocol or the service attribute to a network device through the wireless connection to the second terminal; and wherein the parameter information comprises at least any one of:
    protocol/service multiplexer (PSM) values corresponding to a cellular network protocol service identifier, a version number of a cellular network protocol, and a type of a cellular network protocol, wherein the cellular network protocol service identifier, the version number of the cellular network protocol, or the type of the cellular network protocol corresponds to at least one PSM value.

2. The method according to claim 1, wherein obtaining, by the first terminal, the parameter information comprises:
    receiving, by the first terminal, a radio resource control (RRC) message sent by an access network device, wherein the RRC message carries the parameter information, and the RRC message comprises a system broadcast message or comprises independent signaling for the first terminal; or
    receiving, by the first terminal, a non-access stratum (NAS) message sent by a core network device, wherein the NAS message carries the parameter information.

3. The method according to claim 1, wherein the non-cellular network protocol transmission technology comprises any one of the following transmission technologies: a Wireless Fidelity (Wi-Fi) technology, a ZigBee technology, a Bluetooth (BT) technology, a Bluetooth low energy (BLE) technology, and a Wireless Fidelity Direct technology.

4. The method according to claim 1, wherein the non-cellular network protocol transmission technology is a Bluetooth technology, and wherein establishing, by the first terminal, the wireless connection to a second terminal based on the parameter information comprises:
    sending, by the first terminal, a probe request message when the first terminal detects that a Bluetooth function of the first terminal is enabled, wherein the probe request message carries an identifier of the first terminal and the parameter information of the protocol or service attribute of the data packet of the first terminal;
    receiving, by the first terminal, a probe response message sent by the second terminal, wherein the probe response message is generated after the second terminal detects the probe request message, and the probe response message carries an identifier of the second terminal;
    sending, by the first terminal, a logical link request message to the second terminal, wherein the logical link request message carries a channel identifier of the first terminal and a PSM value of the first terminal;
    receiving, by the first terminal, a logical link response message sent by the second terminal, wherein the logical link response message carries a channel identifier of the second terminal and the channel identifier of the first terminal; and
    determining, by the first terminal, that data from the channel identifier of the second terminal is processed by a protocol stack entity corresponding to the PSM value of the first terminal.

5. The method according to claim 1, wherein the parameter information further comprises a correspondence between a quality of service (QoS) parameter in a cellular network protocol and a Logical Link Control and Adaptation Protocol (L2CAP) parameter in a Bluetooth technology.

6. The method according to claim 1, wherein obtaining, by the first terminal, the parameter information comprises:
    obtaining, by the first terminal, the parameter information configured in advance.

7. The method according to claim 6, wherein establishing, by the first terminal, the wireless connection to the second terminal based on the parameter information comprises:
    sending, by the first terminal, a first message to the network device when the first terminal detects that a short-range wireless or low-power wireless function of the first terminal is enabled and detects the second terminal on a short-range wireless or low-power wireless channel, wherein the first message carries an identifier of the second terminal, and the first message is configured to instruct the network device to find the second terminal to which the wireless connection is to be established, and a connection between the first terminal and the network device has been established;
    receiving, by the first terminal, a first short-range wireless or low-power wireless terminal pairing message sent by the network device, wherein the first short-range wireless or low-power wireless terminal pairing message carries at least a PSM value of the second terminal, and the PSM value of the second terminal is configured to indicate that an upper-layer data protocol of a logical link control protocol layer of a short-range wireless or low-power wireless technology in the second terminal is a cellular network protocol or that the PSM value of the second terminal is in a one-to-one correspondence with a cellular radio bearer (RB); and configuring, by the first terminal, a logical link control protocol layer, an adaptation layer, or a Media Access Control layer of the first terminal based on the PSM value of the second terminal, to establish the wireless connection to the second terminal.

8. The method according to claim 7, wherein the first message further comprises a serving cell identifier of the second terminal.

9. The method according to claim 7, wherein the first message further comprises a PSM value of the first terminal, and the PSM value of the first terminal is configured to indicate that an upper-layer data protocol of a logical link control protocol layer of a short-range wireless or low-power wireless technology in the first terminal is a cellular network protocol.

10. A terminal, wherein the terminal serves as a first terminal and comprises:
a receiver, configured to obtain parameter information for indicating a type of a protocol or a service attribute of a data packet;
a processor, configured to establish a wireless connection to a second terminal based on the parameter information, wherein a non-cellular network protocol transmission technology is used for the wireless connection; and
a transmitter, configured to transmit the data packet of the type of the protocol or the service attribute to a network device through the wireless connection to the second terminal; and, wherein the parameter information comprises at least any one of:
protocol/service multiplexer (PSM) values corresponding to a cellular network protocol service identifier, a version number of a cellular network protocol, and a type of a cellular network protocol, wherein the cellular network protocol service identifier, the version number of the cellular network protocol, or the type of the cellular network protocol corresponds to at least one PSM value.

11. The terminal according to claim 10, wherein the receiver is configured to:
receive a radio resource control (RRC) message sent by an access network device, wherein the RRC message carries the parameter information, and the RRC message comprises a system broadcast message or comprises independent signaling for the first terminal; or
receive a non-access stratum (NAS) message sent by a core network device, wherein the NAS message carries the parameter information.

12. The terminal according to claim 10, wherein the non-cellular network protocol transmission technology comprises any one of the following transmission technologies:
a Wireless Fidelity (Wi-Fi) technology, a ZigBee technology, a Bluetooth (BT) technology, a Bluetooth low energy (BLE) technology, and a Wireless Fidelity Direct technology.

13. The terminal according to claim 10, wherein:
the non-cellular network protocol transmission technology is a Bluetooth technology;
the transmitter is configured to:

send a probe request message when the first terminal detects that a Bluetooth function of the first terminal is enabled, wherein the probe request message carries an identifier of the first terminal and the parameter information of the protocol or service attribute of the data packet of the first terminal, and
send a logical link request message to the second terminal, wherein the logical link request message carries a channel identifier of the first terminal and a PSM value of the first terminal;
the receiver is configured to:
receive a probe response message sent by the second terminal, wherein the probe response message is generated after the second terminal detects the probe request message, and the probe response message carries an identifier of the second terminal, and
receive a logical link response message sent by the second terminal, wherein the logical link response message carries a channel identifier of the second terminal and the channel identifier of the first terminal; and
the processor is configured to:
determine that data from the channel identifier of the second terminal is processed by a protocol stack entity corresponding to the PSM value of the first terminal.

14. The terminal according to claim 10, wherein the parameter information further comprises a correspondence between a quality of service (QoS) parameter in a cellular network protocol and a Logical Link Control and Adaptation Protocol (L2CAP) parameter in a Bluetooth technology.

15. The terminal according to claim 10, wherein the parameter information is obtained configured in advance.

16. The terminal according to claim 15, wherein:
the transmitter is configured to:
send a first message to the network device when the first terminal detects that a short-range wireless or low-power wireless function of the first terminal is enabled and detects the second terminal on a short-range wireless or low-power wireless channel, wherein the first message carries an identifier of the second terminal, and the first message is configured to instruct the network device to find the second terminal to which the wireless connection is to be established, and a connection between the first terminal and the network device has been established;
the receiver is configured to:
receive a first short-range wireless or low-power wireless terminal pairing message sent by the network device, wherein the first short-range wireless or low-power wireless terminal pairing message carries at least a PSM value of the second terminal, and the PSM value of the second terminal is used to indicate that an upper-layer data protocol of a logical link control protocol layer of a short-range wireless or low-power wireless technology in the second terminal is a cellular network protocol or that the PSM value of the second terminal is in a one-to-one correspondence with a cellular radio bearer RB; and
the processor is configured to:
configure a logical link control protocol layer, an adaptation layer, or a Media Access Control layer of the first terminal based on the PSM value of the second terminal, to establish the wireless connection to the second terminal.

17. The terminal according to claim 16, wherein the first message further comprises a serving cell identifier of the second terminal.

18. The terminal according to claim 16, wherein the first message further comprises a PSM value of the first terminal for indicating that an upper-layer data protocol of a logical link control protocol layer of a short-range wireless or low-power wireless technology in the first terminal is a cellular network protocol.

\* \* \* \* \*